(12) United States Patent
Carlioz et al.

(10) Patent No.: US 10,421,547 B2
(45) Date of Patent: Sep. 24, 2019

(54) UNIVERSAL REST SEATS

(71) Applicant: Safran Seats USA LLC, Gainesville, TX (US)

(72) Inventors: Victor Carlioz, Newport Beach, CA (US); Matthew Cleary, Pismo Beach, CA (US); Hugo Jamson, London (GB); Lito Karatsoli, Jersey City, NJ (US); Felix Lorsignol, San Luis Obispo, CA (US); Luke Miles, London (GB)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/554,191

(22) PCT Filed: Apr. 4, 2016

(86) PCT No.: PCT/US2016/025846
§ 371 (c)(1),
(2) Date: Aug. 28, 2017

(87) PCT Pub. No.: WO2016/164299
PCT Pub. Date: Oct. 13, 2016

(65) Prior Publication Data
US 2018/0079508 A1 Mar. 22, 2018

Related U.S. Application Data

(60) Provisional application No. 62/144,747, filed on Apr. 8, 2015, provisional application No. 62/144,740, filed (Continued)

(51) Int. Cl.
*B64D 11/06* (2006.01)
*B61D 33/00* (2006.01)
(Continued)

(52) U.S. Cl.
CPC ............. *B64D 11/064* (2014.12); *B60N 2/01* (2013.01); *B60N 2/885* (2018.02); *B60N 2/91* (2018.02);
(Continued)

(58) Field of Classification Search
CPC . B60N 2/01; B60N 2/20; B60N 2/242; B60N 2/885; B60N 2/91; B61D 33/00;
(Continued)

(56) References Cited

U.S. PATENT DOCUMENTS 2,730,164 A * 1/1956 Higley David E ........................... B61D 33/0021 297/321
3,632,161 A * 1/1972 Arfaras .................... A47C 7/70 297/145

(Continued)

FOREIGN PATENT DOCUMENTS

| EP | 2578447 | 4/2013 |
| GB | 2510765 | 8/2014 |

(Continued)

OTHER PUBLICATIONS

International Patent Application No. PCT/US2016/025846, Search Report and Written Opinion, dated Jun. 10, 2016.
(Continued)

*Primary Examiner* — James M Ference
(74) *Attorney, Agent, or Firm* — Kilpatrick Townsend & Stockton LLP; Dean W. Russell; Anthony L. Guebert

(57) ABSTRACT

A passenger seat assembly (150) includes a seat support (486) and an immobile seat shell (384) mounted on the seat support (486). The seat shell (384) can include a bench (388) and a backrest (390). The bench (388) includes a forward edge (392), an aft edge (394), and a top surface (301) extending between the forward edge (392) and the aft edge
(Continued)

(394). The backrest (390) can be connected to the aft edge (394) of the bench (388) and can extend in an upward direction from the top surface (301) of the bench (388). In some cases, the backrest (390) includes an upright portion (303) connected to the bench (388) and angled at a first angle with respect to the top surface (301) of the bench (388), and a resting portion (305) connected to the bench (388) and angled at a second angle with respect to the top surface (301) of the bench (388).

20 Claims, 16 Drawing Sheets

Related U.S. Application Data on Apr. 8, 2015, provisional application No. 62/144,734, filed on Apr. 8, 2015.

(51) Int. Cl.
| | | |
|---|---|---|
| *B60N 2/01* | (2006.01) | |
| *B60N 2/90* | (2018.01) | |
| *B60N 2/885* | (2018.01) | |
| *B60N 2/20* | (2006.01) | |
| *B60N 2/24* | (2006.01) | |
| *B63B 29/04* | (2006.01) | |
| *B64G 1/60* | (2006.01) | |

(52) U.S. Cl.
CPC ......... *B61D 33/00* (2013.01); *B61D 33/0007* (2013.01); *B64D 11/0601* (2014.12); *B64D 11/0604* (2014.12); *B60N 2/20* (2013.01); *B60N 2/242* (2013.01); *B63B 2029/043* (2013.01); *B64G 1/60* (2013.01)

(58) Field of Classification Search
CPC .......... B61D 33/0007; B63B 2029/043; B64D 11/0601; B64D 11/0604; B64D 11/064; B64G 1/60
See application file for complete search history.

(56) References Cited

U.S. PATENT DOCUMENTS

| | | | | |
|---|---|---|---|---|
| D355,777 S * | 2/1995 | Emoto | ............ | D6/334 |
| D374,993 S * | 10/1996 | Emoto | ............ | D6/334 |
| 5,716,026 A * | 2/1998 | Pascasio | ............ | B64D 11/00 |
| | | | | 105/315 |
| 5,992,798 A * | 11/1999 | Ferry | ............ | A47C 1/0352 |
| | | | | 244/118.6 |
| 6,056,239 A * | 5/2000 | Cantu | ............ | B64D 11/06 |
| | | | | 244/118.5 |
| 6,059,364 A * | 5/2000 | Dryburgh | ............ | A47C 1/0352 |
| | | | | 297/354.13 |
| 6,398,164 B1 * | 6/2002 | Fasse | ............ | B64D 11/064 |
| | | | | 244/118.6 |
| D524,211 S * | 7/2006 | Tsuchiya | ............ | D12/195 |
| 7,077,360 B2 * | 7/2006 | Jacob | ............ | B64D 11/00 |
| | | | | 244/118.5 |
| 7,318,622 B2 * | 1/2008 | Rezag | ............ | B64D 11/06 |
| | | | | 297/118 |
| D583,579 S * | 12/2008 | Pearson | ............ | D6/356 |
| 7,997,531 B2 * | 8/2011 | Bettell | ............ | B64D 11/064 |
| | | | | 244/118.6 |
| 8,678,311 B2 * | 3/2014 | Cheung | ............ | B64D 11/00 |
| | | | | 244/118.6 |
| 2004/0232283 A1 * | 11/2004 | Ferry | ............ | B60N 2/206 |
| | | | | 244/118.6 |
| 2005/0012363 A1 * | 1/2005 | Ferry | ............ | B62D 33/0612 |
| | | | | 297/62 |
| 2006/0097553 A1 * | 5/2006 | Spurlock | ............ | B64D 11/06 |
| | | | | 297/248 |
| 2007/0040434 A1 * | 2/2007 | Plant | ............ | B60N 2/34 |
| | | | | 297/354.13 |
| 2007/0164157 A1 * | 7/2007 | Park | ............ | B60N 2/34 |
| | | | | 244/118.6 |
| 2009/0050740 A1 * | 2/2009 | Saint-Jalmes | ............ | B60N 2/0232 |
| | | | | 244/118.6 |
| 2009/0146006 A1 * | 6/2009 | Park | ............ | B60N 2/345 |
| | | | | 244/118.6 |
| 2009/0302158 A1 * | 12/2009 | Darbyshire | ............ | B64D 11/06 |
| | | | | 244/118.6 |
| 2010/0065683 A1 * | 3/2010 | Darbyshire | ............ | B64D 11/06 |
| | | | | 244/118.6 |
| 2010/0065684 A1 * | 3/2010 | Ruiter | ............ | B64D 11/06 |
| | | | | 244/118.6 |
| 2010/0252680 A1 * | 10/2010 | Porter | ............ | B60N 2/01 |
| | | | | 244/118.6 |
| 2012/0146372 A1 * | 6/2012 | Ferry | ............ | B64D 11/06 |
| | | | | 297/232 |
| 2012/0318918 A1 * | 12/2012 | Johnson | ............ | B64D 11/06 |
| | | | | 244/118.6 |
| 2014/0110981 A1 * | 4/2014 | Hasegawa | ............ | B64D 11/06 |
| | | | | 297/243 |
| 2016/0272323 A1 * | 9/2016 | Carlioz | ............ | B64D 11/0646 |
| 2017/0029118 A1 * | 2/2017 | Ehrmann | ............ | B64D 11/0601 |
| 2018/0079508 A1 * | 3/2018 | Carlioz | ............ | B64D 11/0601 |

FOREIGN PATENT DOCUMENTS

| | | |
|---|---|---|
| WO | 2006131636 | 12/2006 |
| WO | 2010109406 | 9/2010 |

OTHER PUBLICATIONS

Europe Patent Application No. 16715986.2, Examination Report (Communication Pursuant to Article 94(3) EPC), dated Feb. 22, 2019, 7 pages.

* cited by examiner

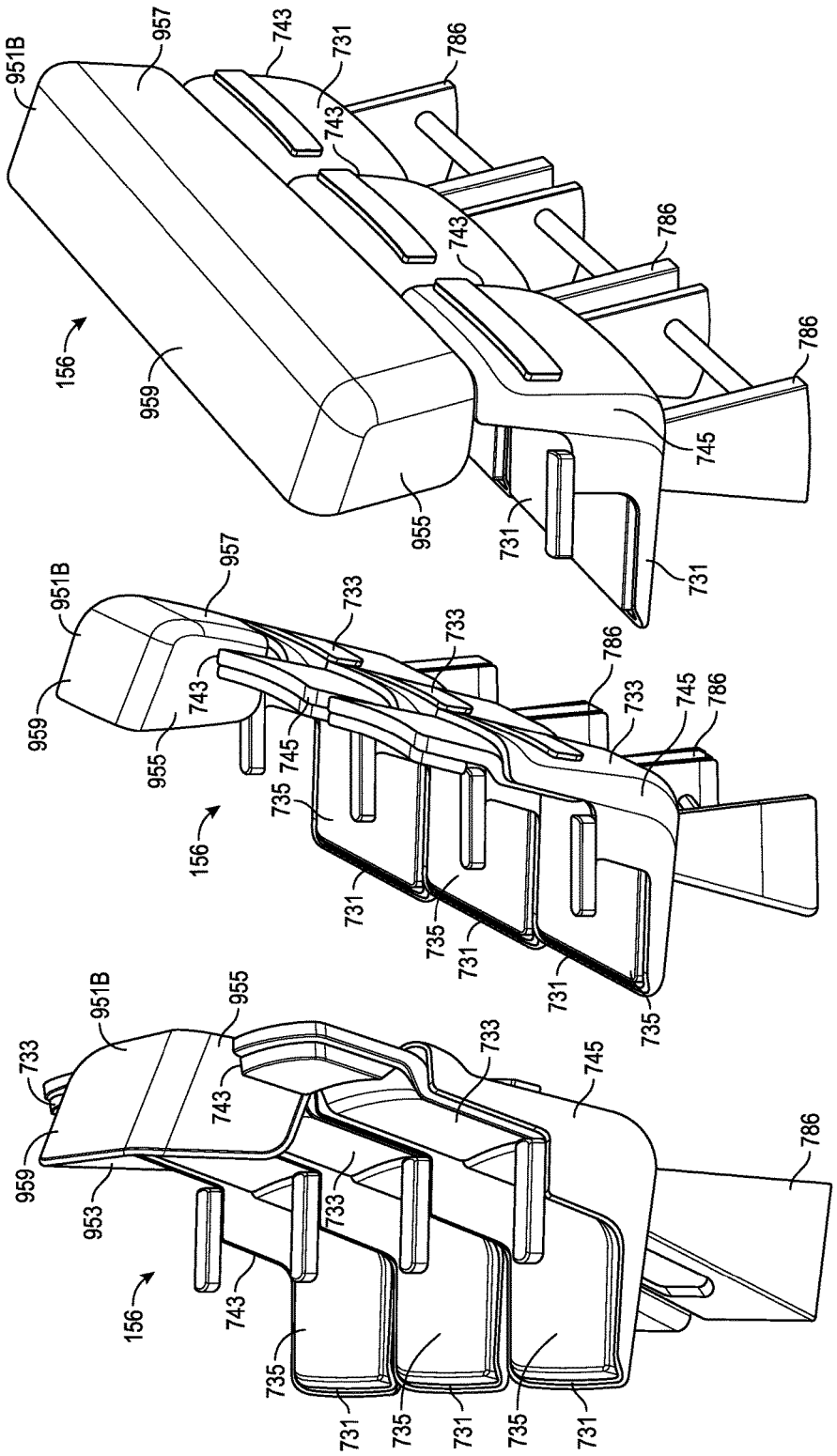

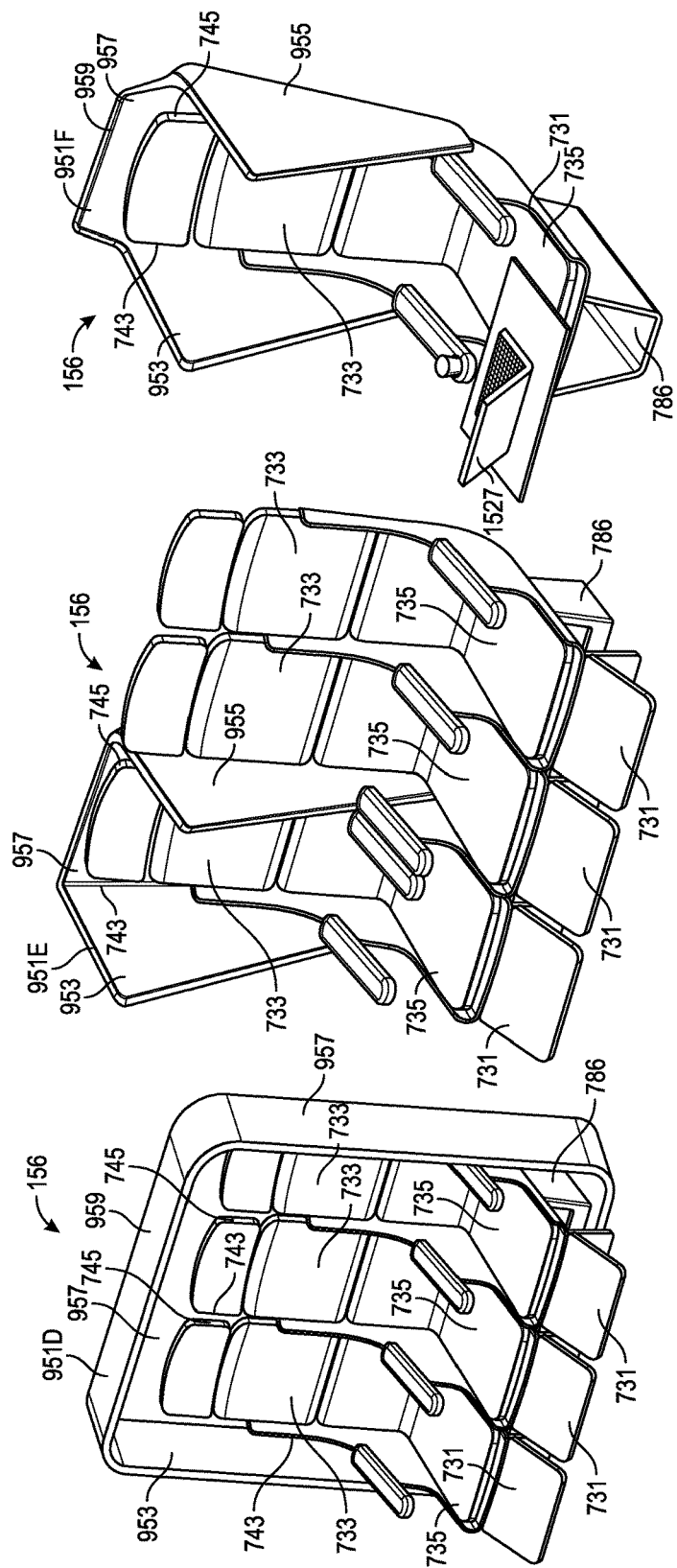

UNIVERSAL REST SEATS

CROSS REFERENCE TO RELATED APPLICATIONS

This patent application is the U.S. national stage entry of PCT/US2016/025846, filed Apr. 4, 2016, which application claims the benefit of U.S. Provisional Application Ser. No. 62/144,734, filed Apr. 8, 2015 and entitled UNIVERSAL REST SEAT, U.S. Provisional Application Ser. No. 62/144,740, filed Apr. 8, 2015 and entitled LIFESTYLE CABIN LOPA, and U.S. Provisional Application Ser. No. 62/144,747, filed Apr. 8, 2015 and entitled ECONOMY SEAT MODULARITY KIT, all of which are hereby incorporated in their entireties by this reference.

FIELD OF THE INVENTION

The invention relates to accommodations for passengers aboard passenger vehicles, and more particularly to arrangements of passenger seats within an aircraft.

BACKGROUND

In many instances, passenger vehicles, such as aircraft, buses, trains, ships, and automobiles, include a cabin in which passengers are seated and can move about. The arrangement of the cabin needs to provide optimum safety conditions and a sufficient number of seats per cabin to meet the economical requirements related to passenger transport while also providing the passengers a high level of comfort.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat shell includes a bench and a backrest. The bench includes a forward edge, an aft edge, and a top surface extending between the forward edge and the aft edge. In some embodiments, the backrest can be connected to the aft edge of the bench and extend in an upward direction from the top surface of the bench. In various embodiments, the backrest is immobile relative to the bench. The backrest can include an upright portion connected to the bench and angled at a first angle with respect to the top surface of the bench, and a resting portion connected to the bench and angled at a second angle with respect to the top surface of the bench.

In some embodiments, the bench further includes a first side edge extending between the forward edge and the aft edge and a second side edge extending between the forward edge and the aft edge distal from the first side edge. The bench can define a bench length as a distance from the forward edge to the aft edge, and the bench can define a bench width as a distance from the first side edge to the second side edge. In certain embodiments, the bench width is greater than the bench length.

In other embodiments, the bench further includes a bench extension extending in a forward direction from the forward edge of the bench proximate the first side edge of the bench. The bench extension includes a bench extension forward edge, a bench extension first side edge, a bench extension second side edge distal from the bench extension first side edge, and a bench extension top surface extending between the bench extension forward edge, the bench extension first side edge, and the bench extension second side edge.

In certain embodiments, the bench extension top surface is coplanar with the top surface of the bench, and the bench extension second side edge is aligned with the second side edge of the bench. In some embodiments, the bench extension defines a bench extension length as a distance from the aft edge of the bench to the bench extension forward edge, and the bench extension defines a bench extension width as a distance from the bench extension first side edge to the bench extension second side edge. In some embodiments, the bench extension length is greater than the bench length, and the bench extension width is less than the bench width.

In other embodiments, the backrest further includes a recline portion connected to the second side edge of the bench angled with respect to the top surface of the bench. In some embodiments, the recline portion is angled at one of the first angle or the second angle with respect to the top surface of the bench. In other embodiments, the recline portion is angled at a third angle with respect to the top surface of the bench. In various embodiments, the resting portion is curved along a portion of the bench length.

According to certain embodiments of the present invention, a passenger seat assembly includes: a seat support; and an immobile seat shell mounted on the seat support. The seat shell includes: a bench having a forward edge, an aft edge, and a top surface extending between the forward edge and the aft edge; and a backrest connected to the aft edge of the bench and extending in an upward direction from the top surface of the bench. In some embodiments, the backrest includes an upright portion connected to the bench and angled at a first angle with respect to the top surface of the bench, and a resting portion connected to the bench and angled at a second angle with respect to the top surface of the bench.

In additional embodiments, the bench further includes: a first side edge extending between the forward edge and the aft edge; a second side edge extending between the forward edge and the aft edge distal from the first side edge; and a bench extension extending in a forward direction from the forward edge of the bench proximate the first side edge of the bench. In some embodiments, the bench extension includes: a bench extension forward edge; a bench extension first side edge; a bench extension second side edge distal from the bench extension first side edge and aligned with the second side edge of the bench; and a bench extension top surface coplanar with the top surface of the bench and extending between the bench extension forward edge, the bench extension first side edge, and the bench extension second side edge.

In certain embodiments, the backrest further includes a recline portion connected to the first side edge of the bench and the bench extension first side edge. In some embodiments, the recline portion is angled with respect to the top surface of the bench. In other embodiments, the backrest also includes an armrest portion connected to the first side edge of the bench and defining an armrest.

In some embodiments, the backrest further includes a recline portion connected to the second side edge of the bench angled with respect to the top surface of the bench. In certain embodiments, the bench extension is aligned with the resting portion of the backrest. In some embodiments, the bench defines a bench length as a distance from the forward edge to the aft edge, the bench defines a bench width as a distance from the first side edge to the second side edge, and the resting portion is curved along a portion of the bench length.

According to certain embodiments of the present invention, a passenger seat shell includes: a bench having a forward edge, an aft edge distal from the forward edge, a first side edge extending from the forward edge to the aft edge, a second side edge extending from the forward edge to the aft edge distal from the first side edge, and a top surface extending between the forward edge and the aft edge; and a backrest connected to the bench. The backrest extends in an upward direction from the top surface of the bench, and can be immobile relative to the bench. In some embodiments, the backrest includes an upright portion connected to the aft edge of the bench and angled at a first angle with respect to the top surface of the bench, and a recline portion connected to the first side edge of the bench and angled at a second angle with respect to the top surface of the bench.

In some embodiments, the bench further includes a bench extension extending in a forward direction from the forward edge of the bench proximate the first side edge of the bench. The bench extension includes: a bench extension forward edge; a bench extension first side edge; a bench extension second side edge distal from the bench extension first side edge and aligned with the second side edge of the bench; and a bench extension top surface extending between the bench extension forward edge, the bench extension first side edge, and the bench extension second side edge.

In certain embodiments, the backrest further includes a resting portion between the upright portion and the recline portion. The resting portion can be connected to the aft edge of the bench and can be angled at a third angle with respect to the top surface of the bench. In various embodiments, the bench defines a bench length as a distance from the forward edge to the aft edge, the bench defines a bench width as a distance from the first side edge to the second side edge, and the resting portion is curved along a portion of the bench length. In some embodiments, the backrest further includes an armrest portion connected to the second side edge of the bench, the armrest portion defining an armrest.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIGS. 11A-C are perspective views of examples of seat assemblies of the second seating area.

FIG. 13 is a perspective view of an example of a seat assembly of the second seating area.

FIG. 14 is a perspective view of an example of a seat assembly of the second seating area.

FIG. 15 is a perspective view of an example of a seat assembly of the second seating area.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide an arrangement for an aircraft cabin and seat assemblies that may be used in such an arrangement. While the seat assemblies are discussed for use with aircraft seats in an aircraft cabin, they are by no means so limited. Rather, embodiments of the seat assemblies may be used in passenger seats or other seats of any type or otherwise as desired. As used herein, "TTL" stands for "taxiing, take-off, and landing." As is known in the art, various aviation regulations prescribe that passengers be in an upright position, or TTL position, at various time periods during travel.

In some embodiments, disclosed is a cabin arrangement for a passenger vehicle, such as an aircraft. The arrangement can comprise a first seating area and a second seating area. In other embodiments, disclosed are seat assemblies. Some seat assemblies can comprise a passenger seat shell having a bench and a backrest, and the backrest can include an upright portion and a resting portion. Other seat assemblies can comprise a modular seat body and a privacy shell.

Figure 1A:
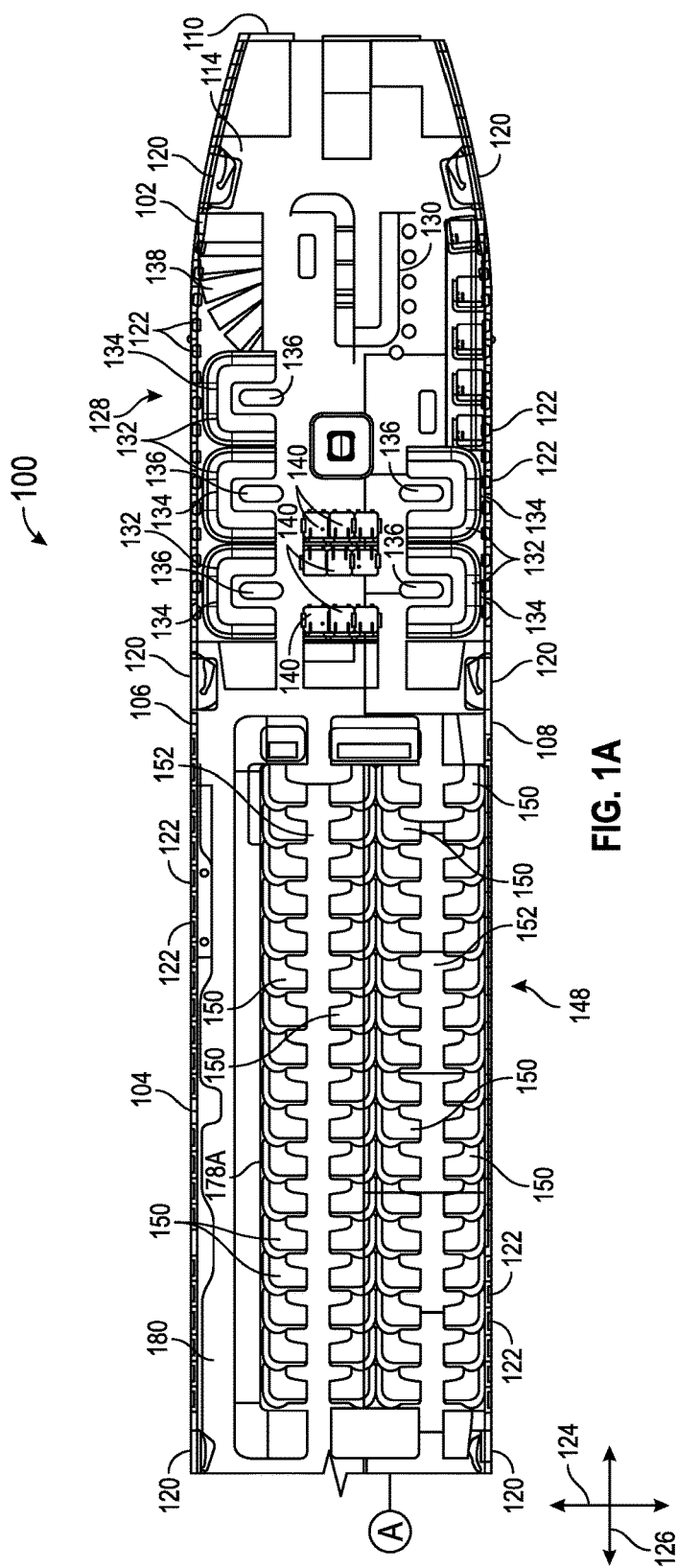
FIGS. 1A-B are schematics of an arrangement for a cabin of an aircraft according to certain embodiments of the present invention, the cabin having a first seating area and a second seating area.
Figure 1B:
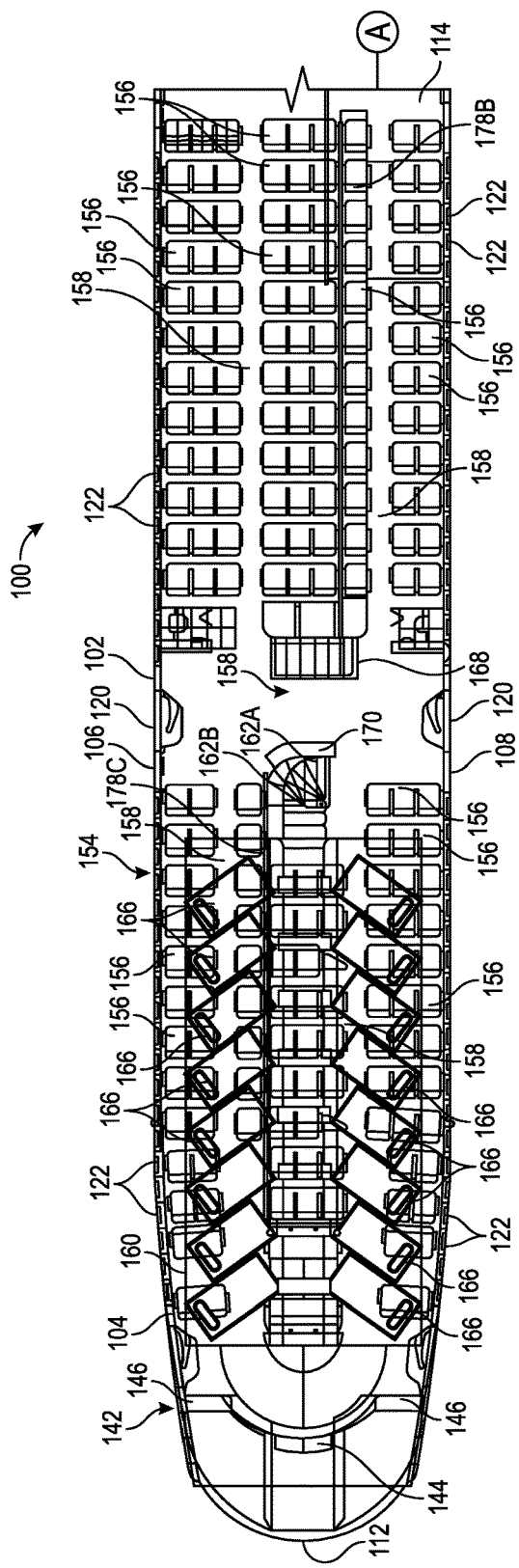

Referring to FIGS. 1A and 1B, in one embodiment, a cabin arrangement 100 for a passenger vehicle is illustrated. In the present embodiment, the cabin arrangement 100 is illustrated as a cabin 102 of an aircraft 104; however, it will be appreciated the cabin arrangement 100 can be utilized in any passenger vehicle including, but not limited to, aircraft, busses, trains, boats, spacecraft, etc. Generally, the cabin 102 comprises a port side 106, a starboard side 108, a forward end 110, and an aft end 112. The cabin 102 defines a lateral direction 124 as a direction extending from the port side 106 to the starboard side 108. The cabin 102 also defines a longitudinal direction 126 as a direction extending from the forward end 110 to the aft end 112. The cabin 102 comprises a floor 114, sidewalls 116, and a ceiling 418 (illustrated in FIG. 4), all of which define an interior of the cabin 102. As is known in the art, the cabin 102 can comprise any number of doors 120 and windows 122.

In some embodiments, the cabin arrangement 100 can comprise a forward lounge area 128 at an area of the cabin 102 towards the forward end 110. In some embodiments, the forward lounge area 128 can comprise a service area 130, such as a bar, serving counter, etc. where a passenger can be served. In other embodiments, the forward lounge area 128 can also define any number of lounge seating areas 132 that include lounge seats 134 and optionally lounge tables 136. In some embodiments, the forward lounge area 128 can comprise stairs 138 providing access to other decks of the aircraft 104.

As illustrated in FIG. 1A, in some embodiments, the forward lounge area 128 comprises a plurality of TTL seats 140 arranged in rows extending in the lateral direction 124. In some embodiments, the TTL seats 140 are configured such that they permanently remain in a TTL position where the backrest of each seat 140 is upright and does not recline. It will be appreciated that the number of TTL seats 140 per row should not be considered limiting on the current disclosure. In some embodiments, some of the TTL seats 140 can be arranged to face the forward end 110 of the cabin 102 and others of the TTL seats 140 can be arranged to face the aft end 112 of the cabin 102. It is also contemplated that in other embodiments, all the TTL seats 140 can face the same end of the cabin 102. In some embodiments, the TTL seats 140 are provided such that passengers in the forward lounge area 128 need not return to their seats in other areas of the cabin 102 during TTL. In other embodiments, the TTL seats 140 are provided such that individuals other than normal passengers may have a place to sit during various time periods.

As illustrated in FIG. 1B, in another embodiment, the cabin arrangement 100 can comprise an aft lounge area 142 at an area of the cabin towards the aft end 112. Similar to the forward lounge area 128, the aft lounge area 142 can comprise a service area 144 and lounge seats 146.

Referring to FIG. 1A, the cabin arrangement 100 can comprise a first seating area 148. In some embodiments, the first seating area 148 is between the forward lounge area 128 and the aft lounge area 142, although it need not be. The first seating area 148 can comprise a plurality of first seat assemblies 150 arranged in rows in the lateral direction 124. It will be appreciated that the number of first seat assemblies 150 per row should not be considered limiting on the current disclosure. It will further be appreciated that in some embodiments, the number of first seat assemblies 150 in one row can be the same or can be different as the number of first seat assemblies 150 in another row. In some embodiments, the first seat assemblies 150 are arranged such that each first seat assembly 150 has direct access to first seating area aisles 152. It will be appreciated that the number of first seating area aisles 152 should not be considered limiting on the current disclosure. The first seat assemblies 150 are described in greater detail below with reference to FIGS. 3-6.

Referring to FIG. 1B, in some embodiments, the cabin arrangement 100 can comprise a second seating area 154. In certain embodiments, the second seating area 154 is between the first seating area 148 and the aft lounge area 142, although it need not be. The second seating area 154 can comprise a plurality of second seat assemblies 156 arranged in rows in the lateral direction 124. It will be appreciated that the number of second seat assemblies 156 per row should not be considered limiting on the current disclosure. It will further be appreciated that in some embodiments, the number of second seat assemblies 156 in one row can be the same or can be different as the number of second seat assemblies 156 in another row. The second seat assemblies 156 are arranged such that at least some of the second seat assemblies 156 have direct access to second seating area aisles 158 and others of the second seat assemblies 156 have indirect access to the second seating area aisles 158. It will be appreciated that the number of second seating area aisles 158 should not be considered limiting on the current disclosure.

In some embodiments, the cabin arrangement 100 can comprise a galley area 139 between some of the rows of second seat assemblies 156. In some embodiments, the galley area 139 can comprise a galley 168 and, optionally, galley seats 170.

Figure 2:
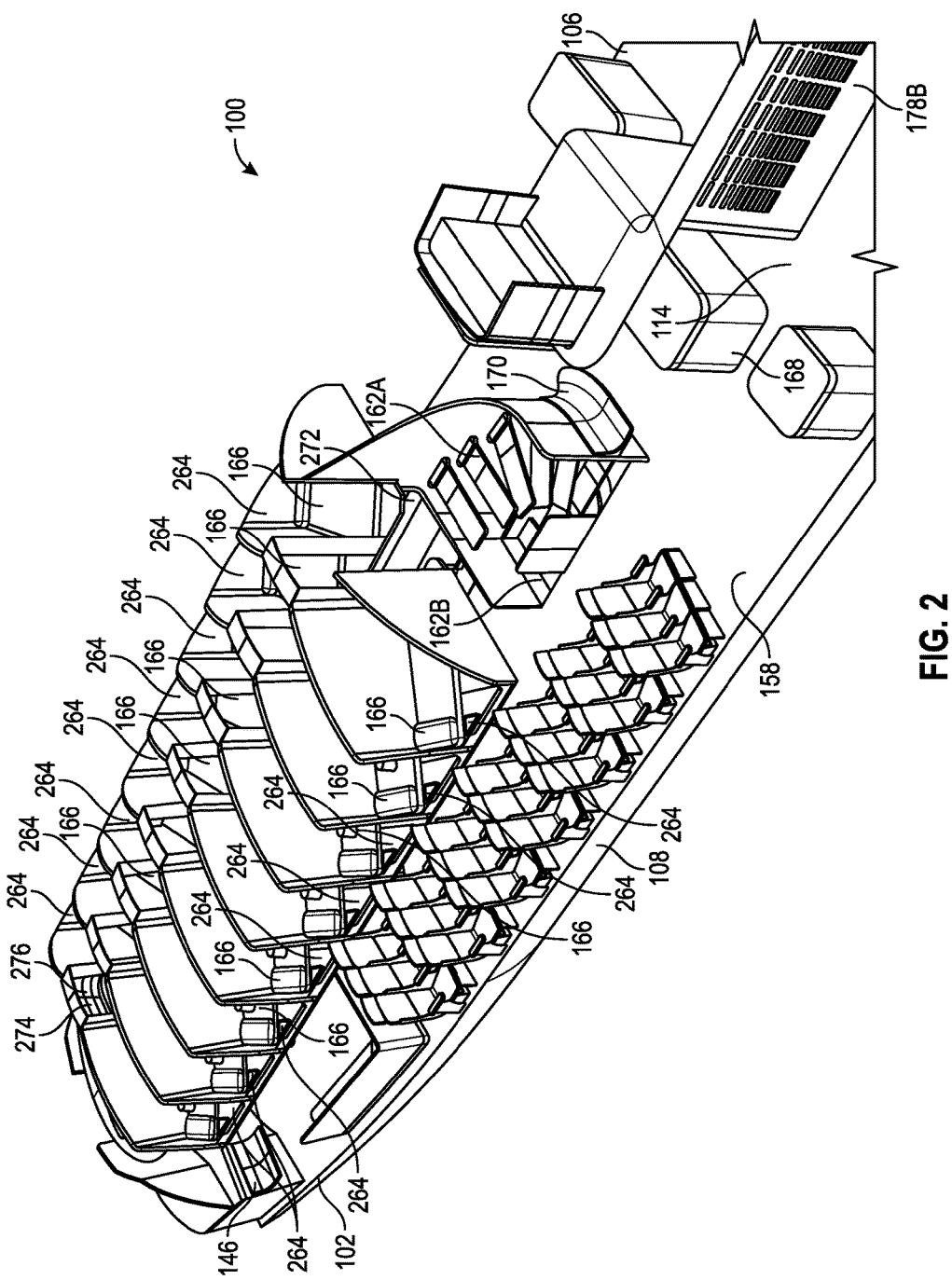
FIG. 2 is a perspective view of a portion of the cabin of FIG. 1B.

In further embodiments, the cabin arrangement 100 can comprise a crown platform 160 positioned above some of the rows of second seat assemblies 156. In some embodiments, the passengers may access the crown platform 160 via stairs 162A. Stairs 162B can be provided in various embodiments to allow access to decks on levels below the level of the cabin arrangement 100. As illustrated in FIGS. 1B and 2, the crown platform 160 comprises a plurality of sleeping compartments 264 having beds 166. In some embodiments, each sleeping compartment 264 can have direct access to a crown aisle 272. As illustrated in FIGS. 1B and 2, in certain embodiments, the sleeping compartments 264 can optionally be in a herringbone configuration, although they need not be. In further embodiments, the crown platform 160 can comprise a crown seating area 274 having a crown seat 276 at an end of the crown aisle 272 distal from the stairs 162A.

In some embodiments, the cabin arrangement 100 can comprise dividers or separation walls 178A-C. It will be appreciated that the number and the location of the separation walls 178A-C should not be considered limiting on the current disclosure. As illustrated in FIGS. 1A and 1B, the separation walls 178A-C extend in the longitudinal direction 126. In some embodiments, the separation walls 178A-C extend substantially parallel to the longitudinal direction 126; however, it is also contemplated that in various other embodiments, the separation walls 178A-C can be curved, angled, or offset relative to the longitudinal direction 126, or have various other desired shapes. Additionally, it is contemplated that the separation walls 178A-C can be centrally positioned between the port side 106 and the starboard side 108 or offset between the port side 106 and the starboard side 108.

The separation walls 178A-C can be transparent or opaque. In some embodiments, the separation walls 178A-C can be used to display information, light, art work, advertisements, etc. As illustrated in FIGS. 2, 4, 5, and 8, in some embodiments, the separation walls 178A-C are optionally perforated such that light can pass through the separation walls 178A-C.

Figure 3:
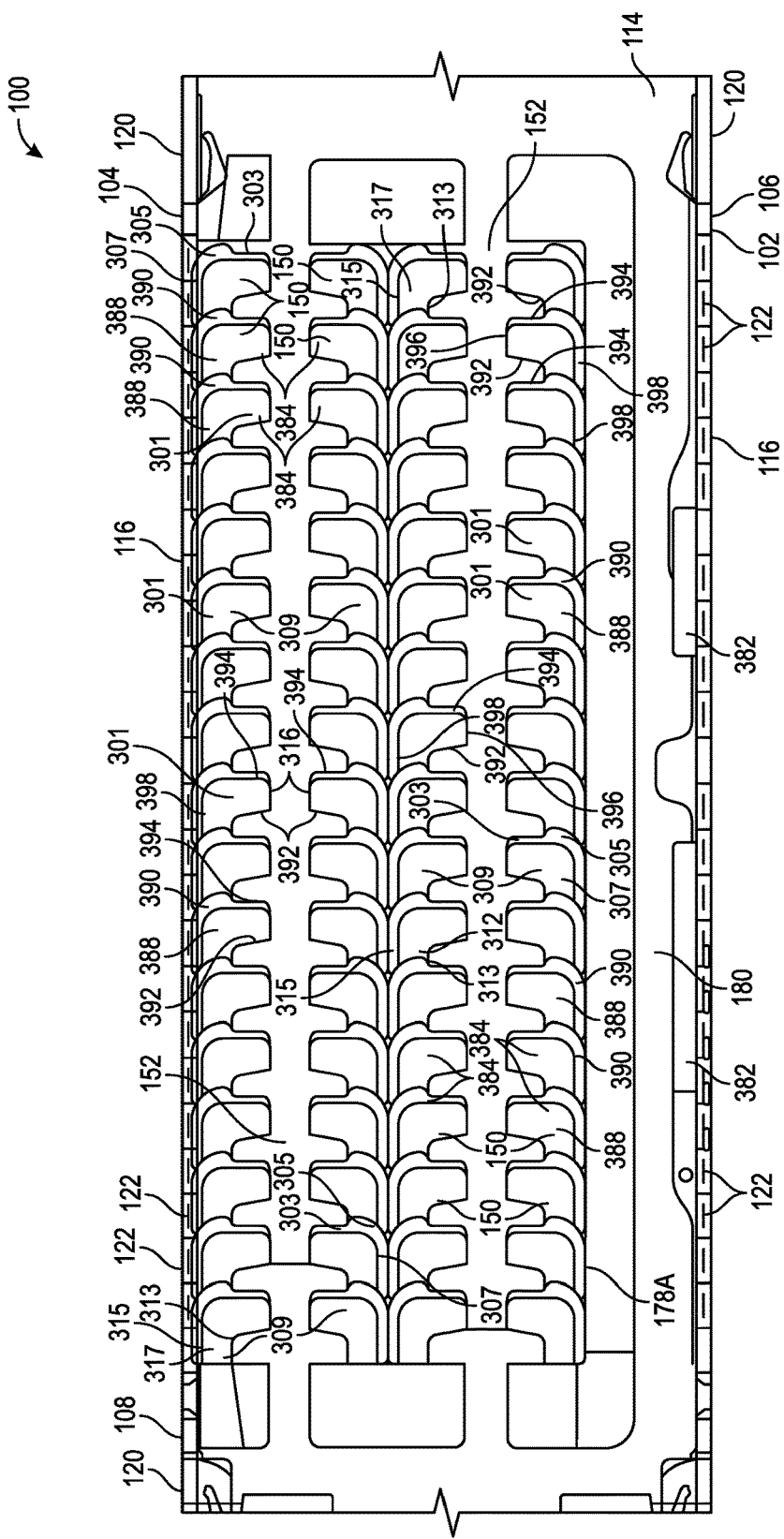
FIG. 3 is a schematic of the first seating area of the cabin of FIGS. 1A-B.
Figure 4:
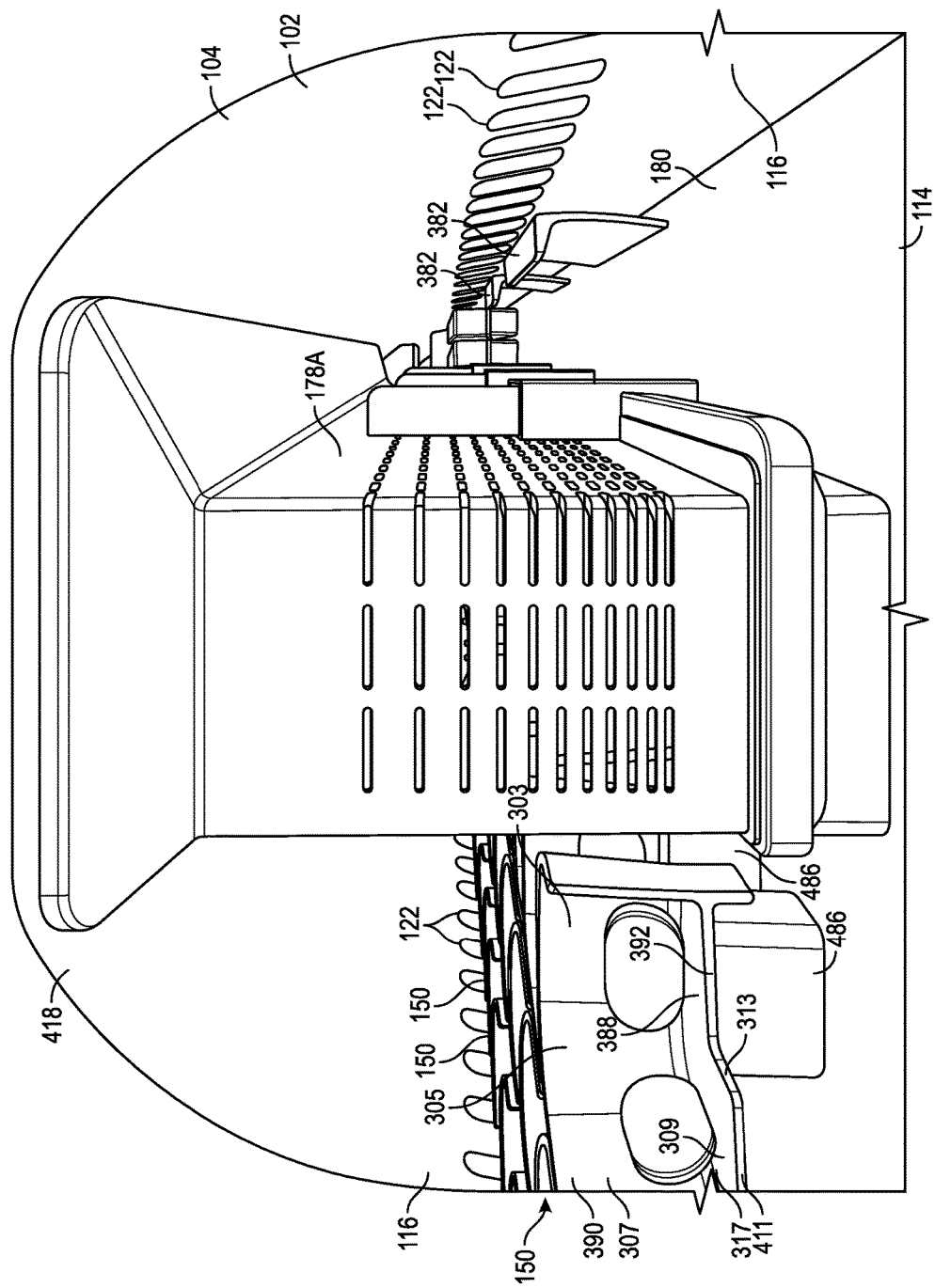
FIG. 4 is a perspective view of the first seating area of FIG. 2.

In certain embodiments, the separation walls 178A-C can be utilized to create additional areas of the cabin 102 or divide areas of the cabin 102 in two. As one non-limiting example, as illustrated in FIG. 1A, the separation wall 178A is positioned between the first seat assemblies 250 of the first seating area 148 and the sidewall 116 at the port side 106 of the cabin 102. In this embodiment, the separation wall 178A can define a public aisle 180 between the separation wall 178A and the sidewall 116 at the port side 106 of the cabin 102. In some embodiments, the public aisle 180 can be an area where passengers can sit or walk without having to walk through the first seating area 148. As illustrated in FIGS. 3 and 4, in some embodiments, the cabin arrangement 100 comprises tables 382 within the public aisle 180.

As another non-limiting example, as illustrated in FIG. 1B, the sidewalls 178B and 178C can be placed between adjacent second seat assemblies 156 of the second seating area 154. In this embodiment, the sidewalls 178B and 178C can be utilized as an extra support for passengers in the adjacent second seat assemblies 156 to lean against. The sidewalls 178B and 178C can also be utilized to provide additional privacy or separation between some of the passengers in the second seat assemblies 156. It is also contemplated that in other embodiments, a plurality separation walls 178 may be positioned such that they overlap in the lateral direction 124. In these embodiments, the plurality of overlapping separation walls 178 may create more than two sections in that area of the cabin 102.

Referring to FIGS. 3-6, the first seat assemblies 150 of the first seating area 148 are described in greater detail. Each first seat assembly 150 comprises a seat shell 384 and a seat support 486. The seat support 486 is mounted to the floor 114 and is configured to support the seat shell 384. Each seat shell 384 of the first seat assemblies 150 comprises a bench 388 and a backrest 390 connected to the bench 388. In various embodiments, the backrest 390 is immobile relative to the bench 388 in that the backrest 390 does not pivot or otherwise move relative to the bench 388.

The bench 388 comprises a forward edge 392, an aft edge 394 distal from the forward edge 392, a first side edge 396 extending between the forward edge 392 and the aft edge 394, and a second side edge 398 distal from the first side edge 396 and extending between the forward edge 392 and the aft edge 394. As illustrated, the bench 388 further comprises a top surface 301 extending between the forward edge 392, the aft edge 394, the first side edge 396, and the second side edge 398. The bench 388 defines a bench length as a distance from the forward edge 392 to the aft edge 394 and defines a bench width as a distance from the first side edge 396 to the second side edge 398. In some embodiments, the bench width can be greater than the bench length, although it need not be.

In certain embodiments, the bench 388 comprises a bench extension 309. As illustrated, the bench extension 309 extends in a forward direction from the forward edge 392 of the bench 388. In various embodiments, the bench extension 309 extends from the forward edge 392 at a location proximate to the second side edge 398 of the bench 388. The bench extension 309 can comprise a bench extension forward edge 411, a bench extension first side edge 313 extending from the forward edge 392 to the bench extension forward edge 411, and a bench extension second side edge 315 distal from the bench extension first side edge 313. The bench extension 309 comprises a bench extension top surface 317 extending between the edges 411, 313, and 315.

In various embodiments, the bench extension top surface 317 is coplanar with the top surface 301 of the bench 388. In certain cases, the bench extension second side edge 315 is aligned with the second side edge 398 of the bench. The bench extension 309 defines a bench extension length as a distance from the aft edge of the bench 388 to the bench extension forward edge 411 and defines a bench extension width as a distance from the bench extension first side edge 313 to the bench extension second side edge 315. In various embodiments, the bench extension length is greater than the bench length, although it need not be. Furthermore, in various embodiments, the bench extension width is less than the bench width.

The backrest 390 can be connected to at least the aft edge 394 of the bench 388. In various embodiments, it is contemplated that the backrest 390 can also be connected to the first side edge 396, the second side edge 398, or both side edges 396 and 398. The backrest 390 generally extends in an upward direction from the top surface 301 of the bench 388.

As illustrated, the backrest 390 can comprise an upright portion 303 and a resting portion 305. In various embodiments, the upright portion 303 is connected to the bench 388 and is angled at a first angle with respect to the top surface 301 of the bench 388. In some embodiments, the upright portion 303 is connected to the aft edge 394 of the bench 388. In various embodiments, the first angle is a suitable angle for a backrest of a seat during TTL. In this embodiment, the passenger sitting in the first seat assembly 150 with his or her back against the upright portion 303 may be in a position suitable for TTL. In certain cases, the upright portion 303 defines a planar surface which the passenger may rest against, although it is contemplated that the upright portion 303 can also define a curved surface or surface having various other profiles.

In certain embodiments, the resting portion 305 is connected to the bench 388 and is angled at a second angle with respect to the top surface 301 of the bench 388. In some embodiments, the second angle is greater than the first angle but less than about 180°. In various embodiments, the resting portion 305 is connected to the aft edge 394 of the bench 388 such that the person sitting against the resting portion 305 generally faces the same direction as a passenger sitting against the upright portion 303. In various other embodiments, the resting portion 305 is connected to the aft edge 394 and the second side edge 398 such that the person sitting against the resting portion 305 is facing a direction angled relative to the direction of a passenger sitting against the upright portion 303. In yet further embodiments, the resting portion 305 is connected to the second side edge 398 such that the person sitting against the resting portion 305 faces a direction that is generally perpendicular to the direction of a passenger sitting against the upright portion 303. It is also contemplated that the resting portion 305 can be connected to the bench extension second side edge 315 in various embodiments. In various embodiments, the resting portion 305 is aligned with the bench extension 309 in the direction of the bench extension length.

In some embodiments, the resting portion 305 defines a planar surface which the passenger may rest against. In various other embodiments, the resting portion 305 defines a curved surface that is curved along the direction of the bench length. In this embodiment, the resting portion is curved along a portion of the bench length. In various embodiments, the resting portion 305 defines a curved surface that is curved along the direction of the bench width.

In this embodiment, the resting portion is curved along a portion of the bench width. It will be appreciated that surfaces with various other shapes are also contemplated.

In some embodiments, in addition to the upright portion 303 and the resting portion 305, the backrest 390 also can comprise a recline portion 307. In these embodiments, the recline portion 307 is connected to the bench 388 and with respect to the top surface 301 of the bench 388. In various embodiments, the recline portion 307 can be angled at the first angle, at the second angle, or at a third angle with respect to the top surface 301 of the bench. 388. In these embodiments, the third angle can be an angle between the first angle and the second angle or can be an angle greater than the second angle but less than about 180°. In various embodiments, the recline portion 307 is connected to the second side edge 398 of the bench 388. It is also contemplated that the recline portion 307 can be connected to the bench extension second side edge 315. In other embodiments, the recline portion 307 can be connected to the aft edge 394 and can be positioned between the upright portion 303 and the resting portion 305. Thus, it will be appreciated that the locations at which each of the upright portion 303, the resting portion 305, and the recline portion 307 connect to the bench 388 can be varied. In various embodiments, the recline portion 307 can be connected to the bench 288 such that the person sitting against the recline portion 307 faces a direction that is generally perpendicular to the direction of a passenger sitting against the upright portion 303, faces a direction that is angled relative to the direction of the passenger sitting against the upright portion 303, or faces the same direction as the passenger sitting against the upright portion 303.

Figure 6:
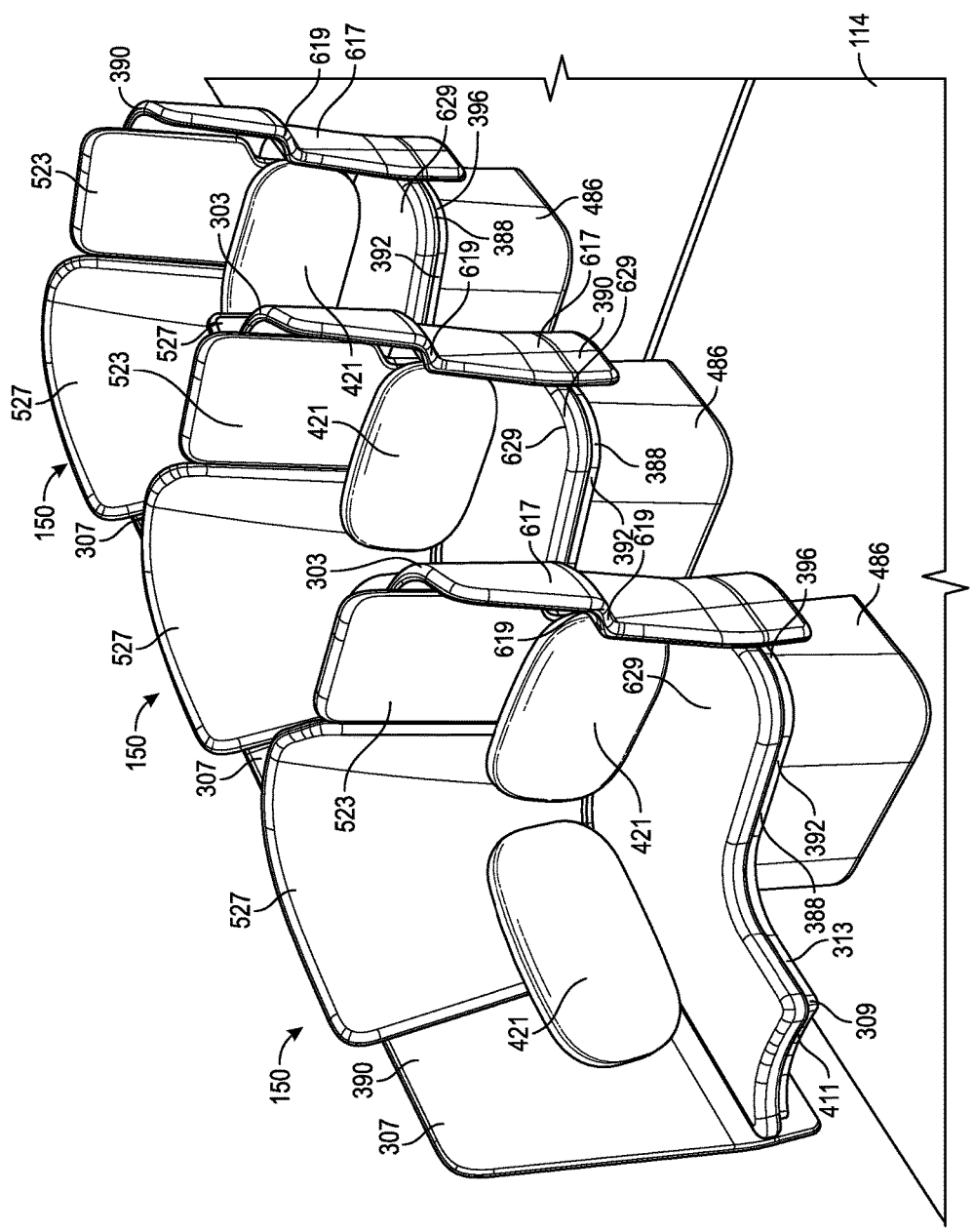
FIG. 6 is a perspective view of seat assemblies of the first seating area of FIG. 2.
Figure 7:
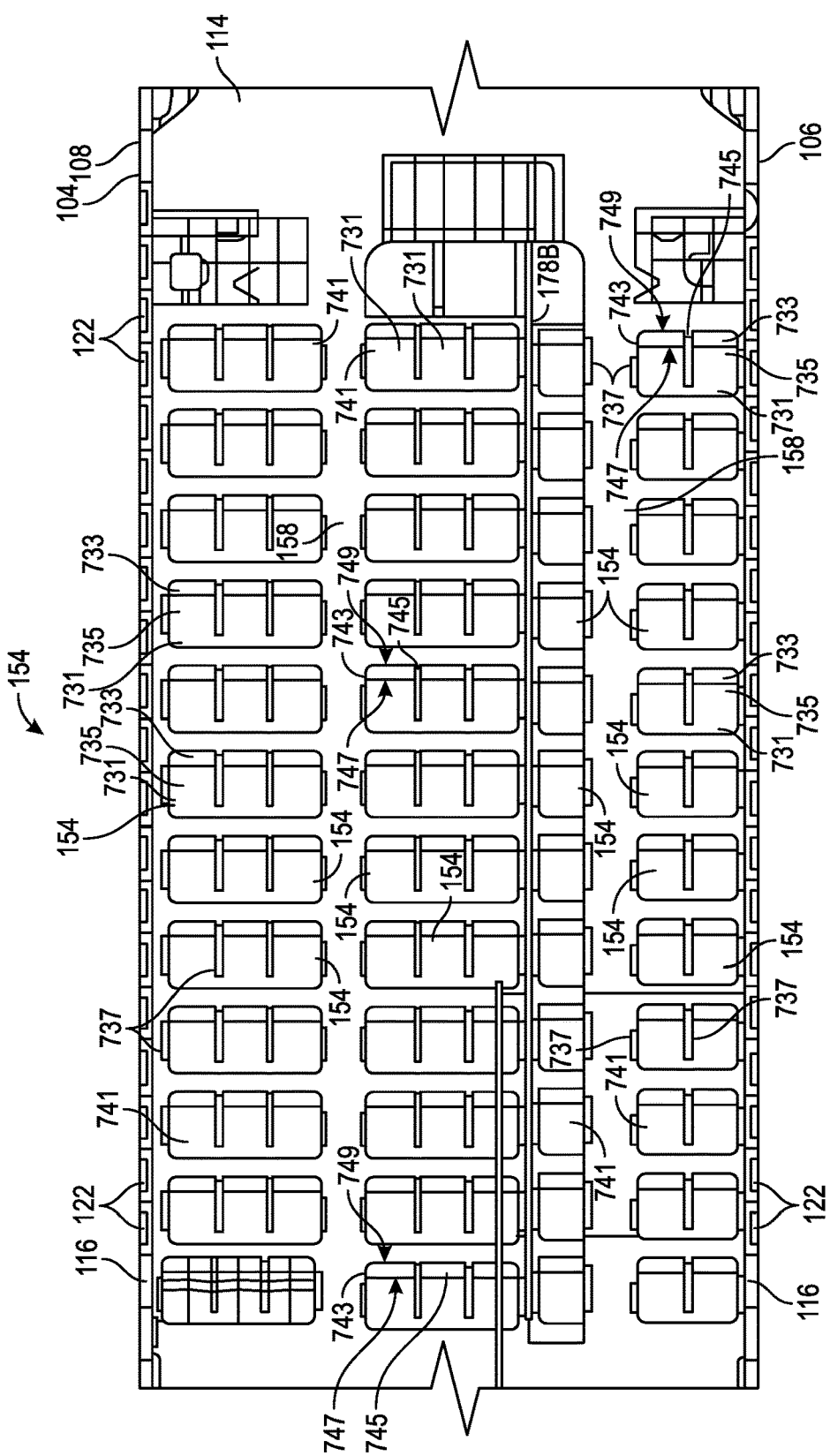
FIG. 7 is a schematic of the second seating area of the cabin of FIGS. 1A-B.
Figure 8:
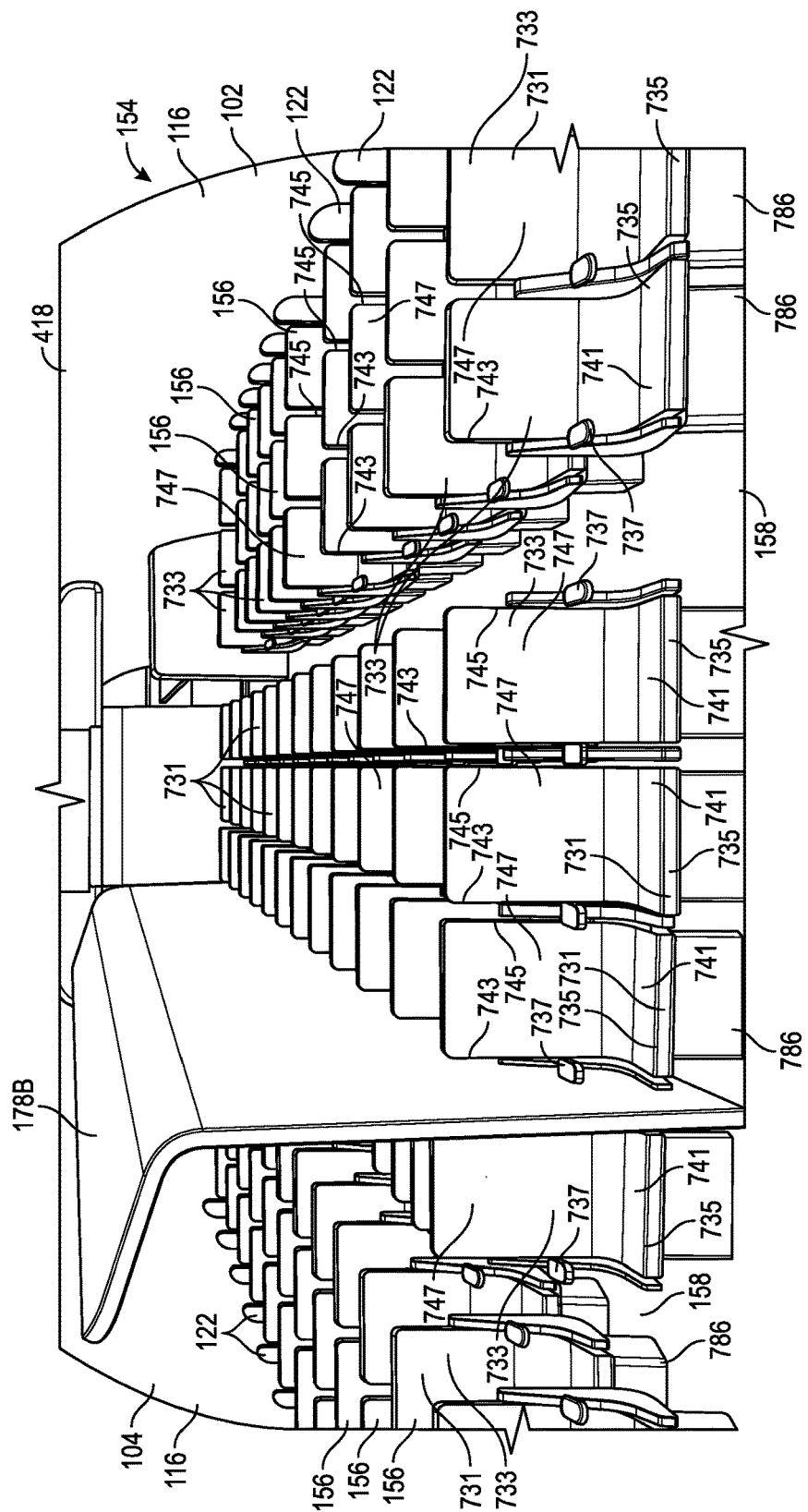
FIG. 8 is a perspective view of the second seating area of FIG. 6.
Figure 9:
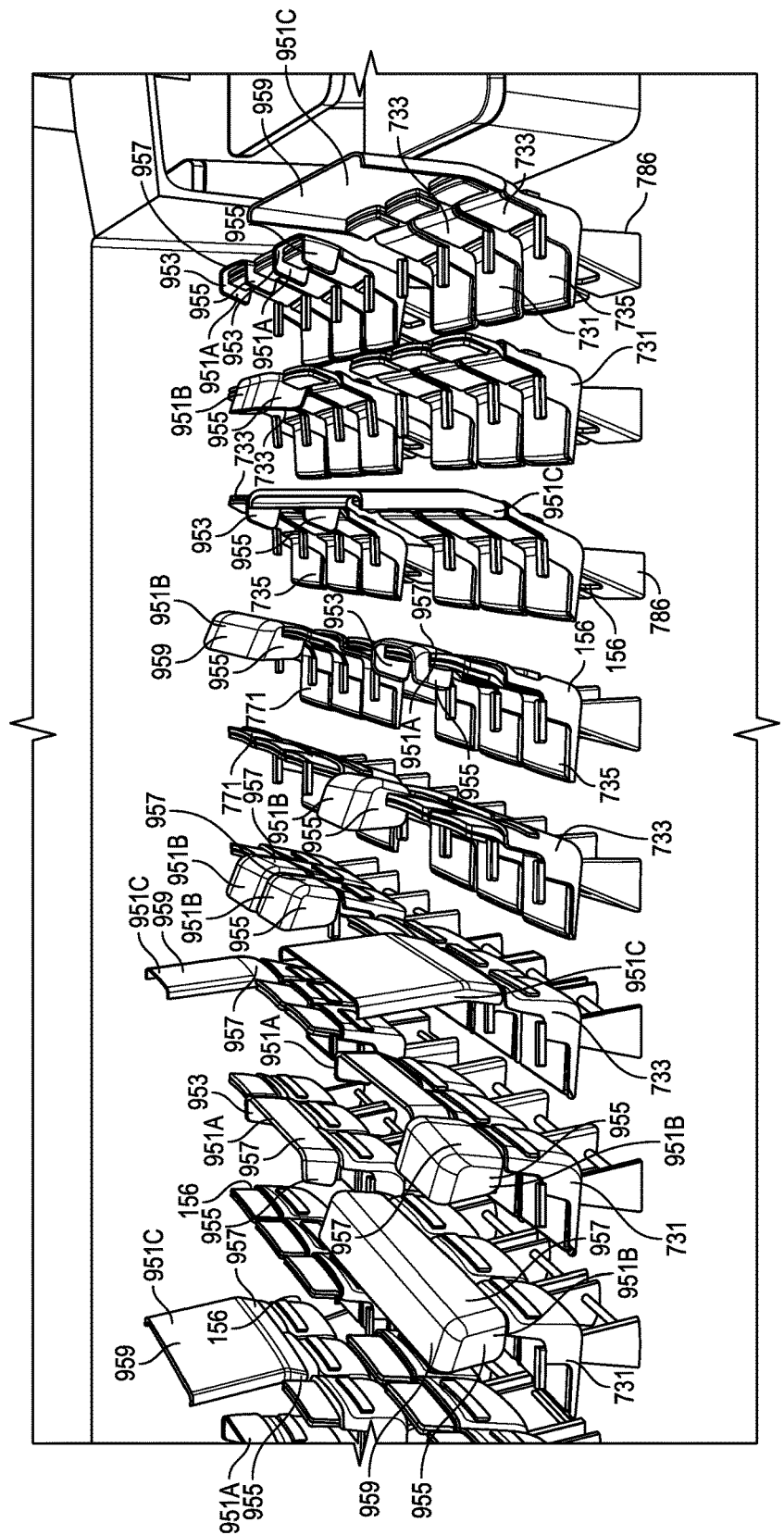
FIG. 9 is another perspective view of the second seating area of FIG. 6.

In some embodiments, as illustrated in FIG. 6, the backrest 390 can further comprise an armrest portion 617 connected to the bench 388. In some embodiments, the armrest portion 617 is connected to the first side edge 396 of the bench. In various embodiments, the armrest portion 617 defines an armrest 619

Figure 5:
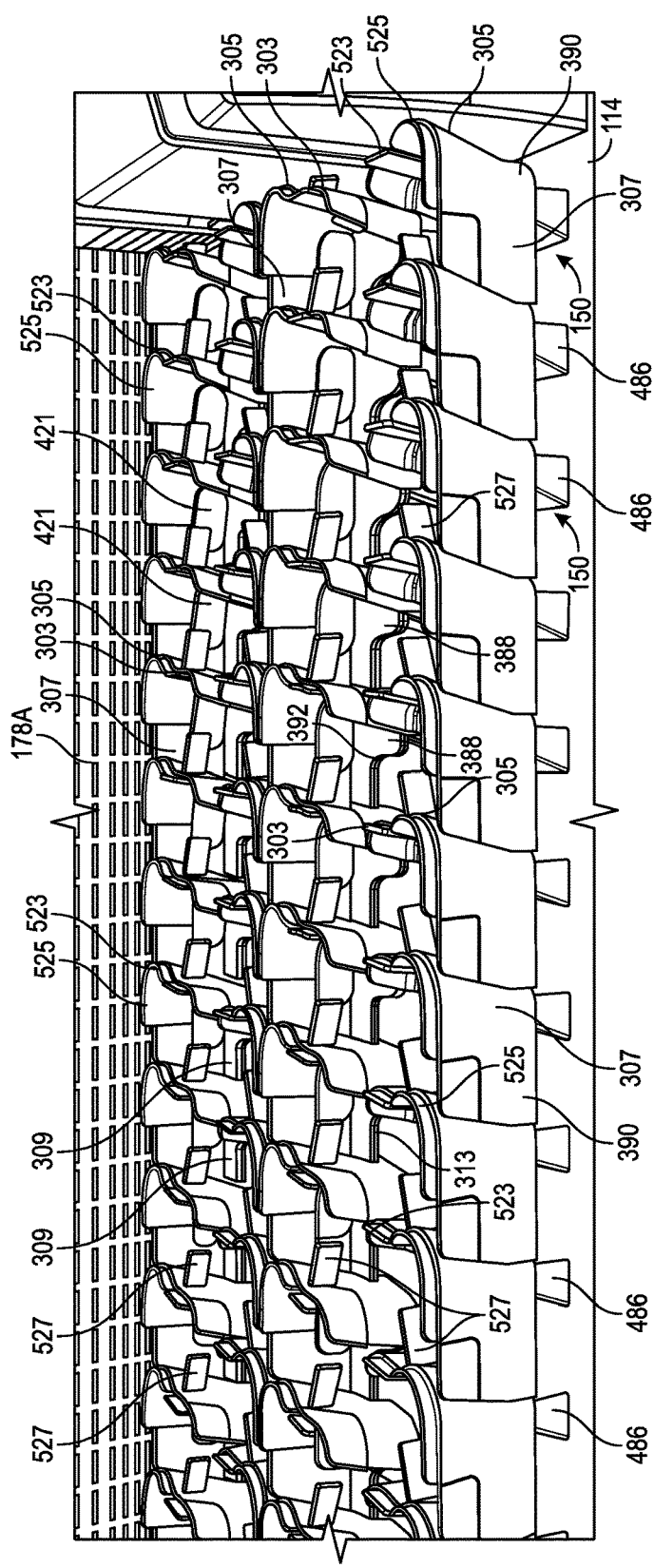
FIG. 5 is another perspective view of the first seating area of FIG. 2.

As illustrated in FIGS. 4-6, in some embodiments, the first seat assemblies 150 can comprise optionally comprise lower back cushions 421. It is contemplated that the lower back cushions 421 can be simply placed within each first seat assembly 150, detachably secured to each first seat assembly 150 such that the lower back cushions 421 can be removed as desired, or permanently secured to each first seat assembly 150 such that the lower back cushions are not readily removable from the first seat assembly 150. In various embodiments, each first seat assembly 150 can also comprise an upright portion cushion 523, which can be positioned against or secured to the upright portion 303 of the backrest 390. Similar to the lower back cushions 421, it is contemplated that the upright portion cushions 523 can be simply placed against the upright portion 303, detachably secured to the upright portion 303, or permanently secured to the upright portion 303.

In a similar manner, the each first seat assembly 150 can comprise a resting portion cushion 525 that can be positioned against or secured to the resting portion 305 of the backrest 390. As with the other cushions, the resting portion cushion 525 can be simply placed against the resting portion 305, detachably secured to the resting portion 305, or permanently secured to the resting portion 305. It is contemplated that in some embodiments, the upright portion cushion 523 and the resting portion cushion 525 can be formed as separate components while in various other embodiments, the upright portion cushion 523 and the resting portion cushion 525 can be formed as a single cushion adapted to conform to the different portions of the backrest 390. It is also contemplated that a recline portion cushion could be included in various embodiments. In some embodiments, each first seat assembly 150 can comprise a bench cushion 629 that can be positioned on the bench 388 and/or the bench extension 309. The bench cushion 629 can be simply placed, detachably secured, or permanently secured as desired.

As illustrated in FIG. 5, in some embodiments, each first seat assembly 150 can comprise an in-flight entertainment (IFE) device 527 or holder for a passenger's IFE device movably secured to a back side of the backrest 390. The IFE device 527 can be utilized by a passenger sitting in the first seat assembly 150 the first seat assembly 150 to which the IFE device 527 is secured. In some embodiments, the IFE device 527 is configured to be movable between various positions such that the passenger can view the IFE device 527 when sitting against any of the upright portion 303, the resting portion 305, or the recline portion 307 of the backrest 390.

Referring to FIGS. 7-15, the second seat assemblies 156 of the second seating area 154 are described in greater detail. Each second seat assembly 156 comprises a modular seat body 731 comprising a backrest 733 connected to a bench 735. Each second seat assembly 156 comprises a seat support 786 mounted to the floor 114 and configured to support the bench 735 and the backrest 733. In various embodiments, the backrest 733 is movable relative to the bench 735 such that the backrest 733 can pivot between a TTL position, where the backrest 733 is at a most-upright position relative to a top surface 741 of the bench 735, and a reclined position. In some embodiments, armrests 737 can be connected to the modular seat body 731. The backrest 733 of each modular seat body 731 comprises a first side 743, a second side 745 distal from the first side 743, a forward-facing surface 747 extending between the first side 743 and the second side 745, and an aft-facing surface 749 extending between the first side 743 and the second side 745.

In various embodiments, as illustrated in FIGS. 9-15, privacy shells 951, such as privacy shells 951A-F, can optionally be mounted to the modular seat bodies 731. The privacy shells 951 can be removably mounted to the modular seat bodies 731 as desired such that different seating experiences can be created for passengers. For example and without limitation, the privacy shells 951 can provide privacy, can link multiple second seat assemblies 156 together, can provide a better IFE experience, can provide a better work experience, etc. The privacy shells 951 can be removably mounted to at least one of the first side 743, the second side 745, or the aft-facing surface 747 of the backrest 733. In some embodiments, the privacy shells 951 can be mounted at multiple locations, such as multiple locations on the aft-facing side 747, mounted to both the first side 743 and the second side 745, mounted to the aft-facing surface 747 and the first side 743, etc. The privacy shells 951 are configured such that when mounted to the modular seat bodies 731, the privacy shells 951 cover at least a portion of at least one of the first side 743 or the second side 745 of the backrest 733. In various embodiments where the modular seat bodies 731 include a headrest on the backrest 733, the privacy shells can be removably mounted to the headrests. In some embodiments, the privacy shells 951 can cover at least a portion of the bench 735 and/or the seat support 786.

In certain embodiments, each privacy shell 951 can comprise a first side panel 953, a second side panel 955 distal from the first side panel 953, and a back panel 957 extending between the first side panel 953 and the second side panel 955. In various embodiments, at least a portion of the privacy shell 951 extends in a forward direction relative to the forward-facing surface 747 of the backrest 733.

In some embodiments, the back panel 957 is mounted to the backrest 733, such as to the aft-facing surface 749 of the backrest 733. In some embodiments, some of the privacy shells 951, such as privacy shells 951B, 951C, and 951F, can comprise a top panel 959 connected to the back panel 957 and extending between the first side panel 953 and the second side panel 955. In various embodiments, the top panel 959 can be angled with respect to the back panel 957. For example, in some embodiments, the top panel 959 can be angled at an obtuse angle relative to the back panel 957, angled at a generally right angle relative to the back panel 957, angled at an acute angle relative to the back panel 957, or angled at any other desired angle. In some embodiments, the top panel 959, and/or any of the other panels 953, 955, 957, can be curved, planar, or have any other desired shape.

Figure 10B:
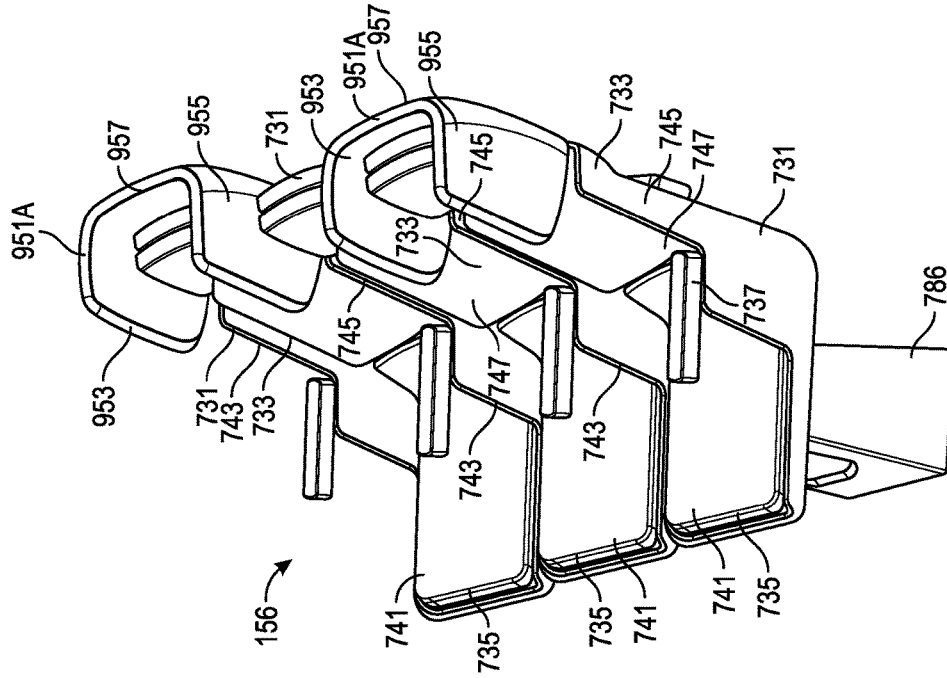
FIGS. 10A-D are perspective views of examples of seat assemblies of the second seating area.
Figure 10A:
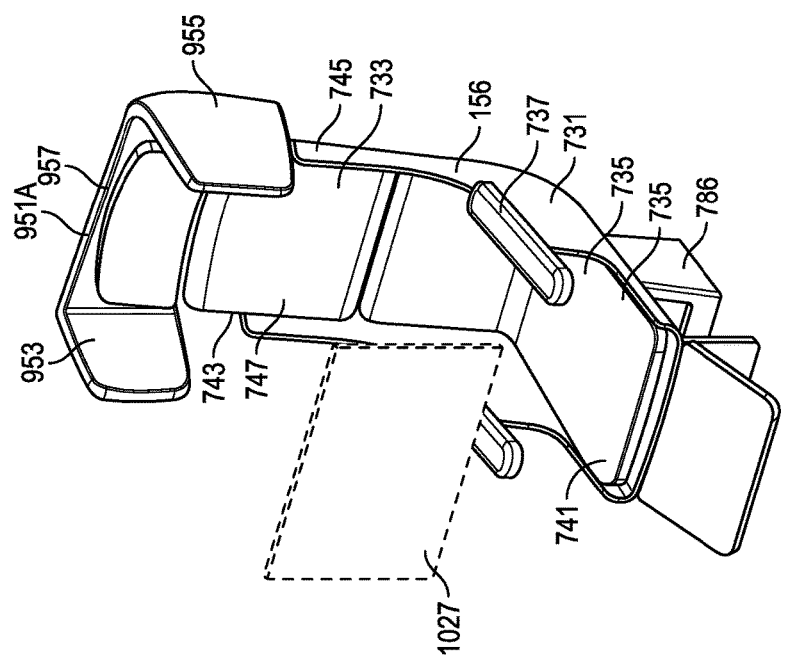
Figure 10D:
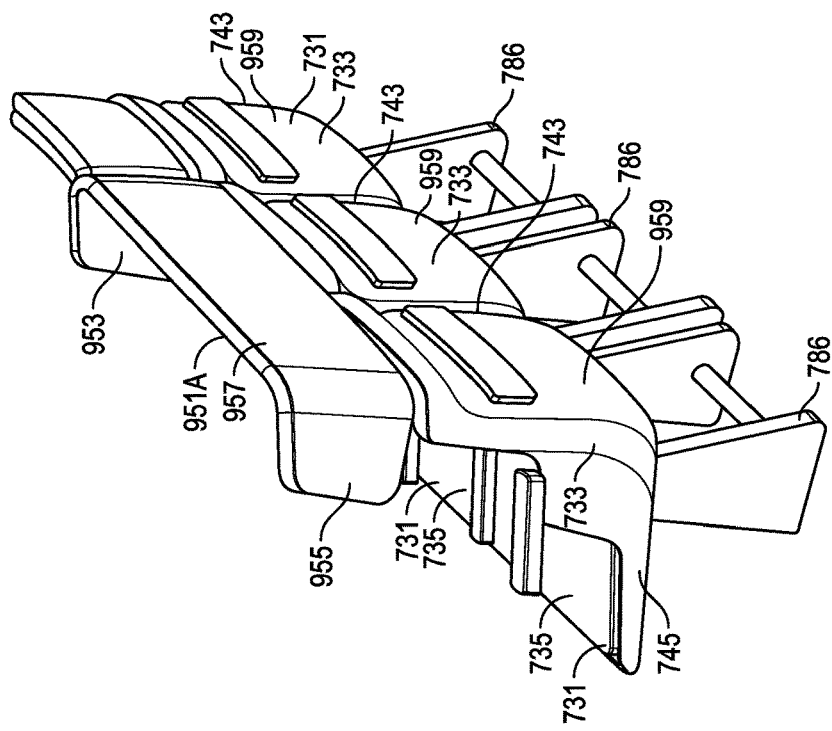
Figure 10C:
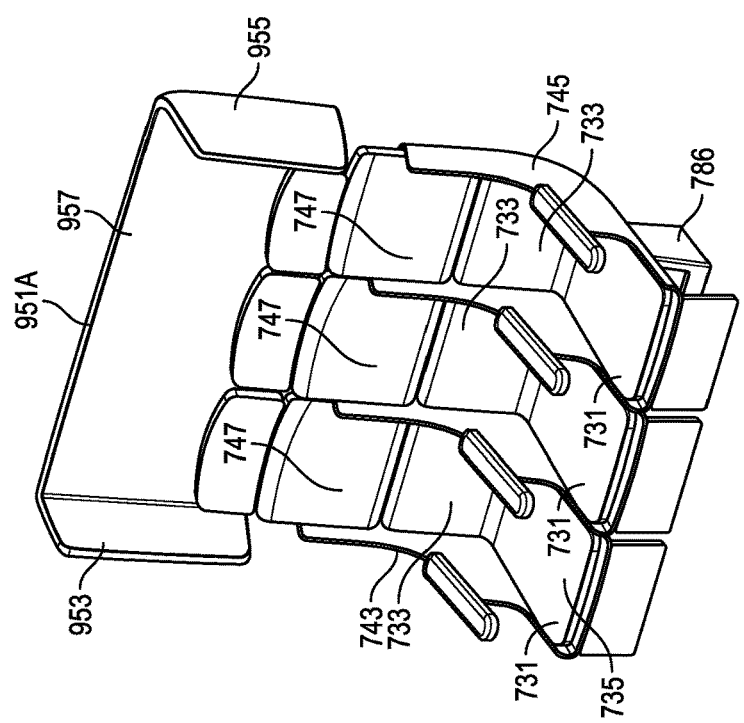

FIGS. 10A-10D illustrate the privacy shell 951A, which can be a movie privacy shell 951A. FIGS. 10A and 10B illustrate the movie privacy shell 951A that is mounted on a single modular seat body 731. As illustrated in FIGS. 10A and 10B, the side panels 953 and 955 of the privacy shell 951A can extend in the forward direction relative to the forward-facing surface 747 of the backrest 733. In these embodiments, the side panels 953 and 955 can aid in reducing distractions coming from either side of the second seat assembly 156 and the passenger can focus on an IFE device 1027. FIGS. 10C and 10D illustrate the movie privacy shell 951A that is mounted on a plurality of modular seat bodies 731. As illustrated in FIGS. 10C and 10D, in these embodiments, the privacy shell 951A is mounted to at least one of the first side 743, the second side 745, or the aft-facing surface 749 of the backrest 733 of at least one of the plurality of modular seat bodies 731. In these embodiments, the privacy shell 951A covers at least a portion of at least one of the first side 743 or the second side 745 of the backrest 733 of a second of the plurality of modular seat bodies 731.

FIGS. 11A-11C illustrate the privacy shell 951B, which can be a covered privacy shell 951B. Compared to the privacy shell 951A, the covered privacy shell 951B includes the top panel 959. The privacy shell 951B can be configured to cover a single modular seat body 731 (FIGS. 11A and 11B) or a plurality of modular seat bodies 731 (FIG. 11C).

Figure 12B:
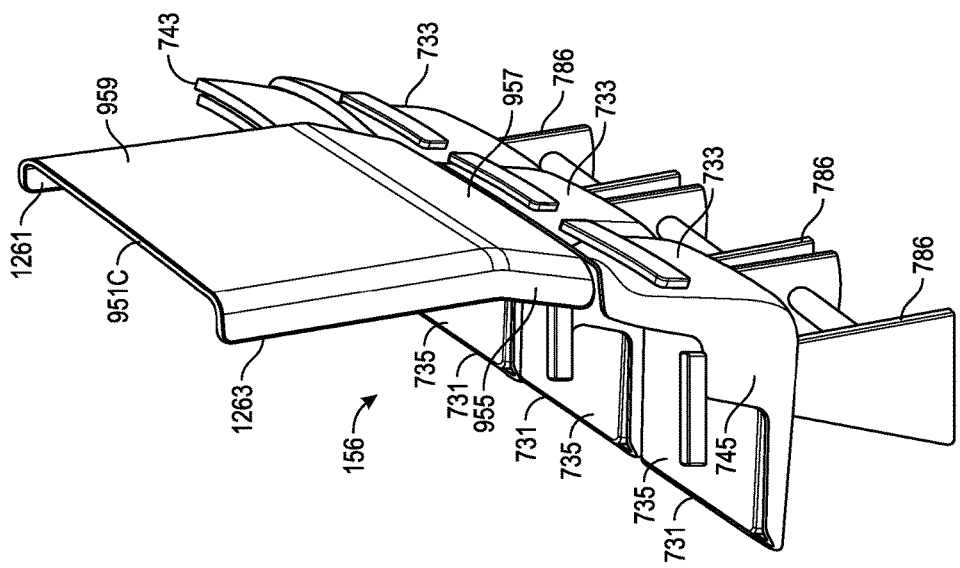
FIGS. 12A-D are perspective views of examples of seat assemblies of the second seating area.
Figure 12A:
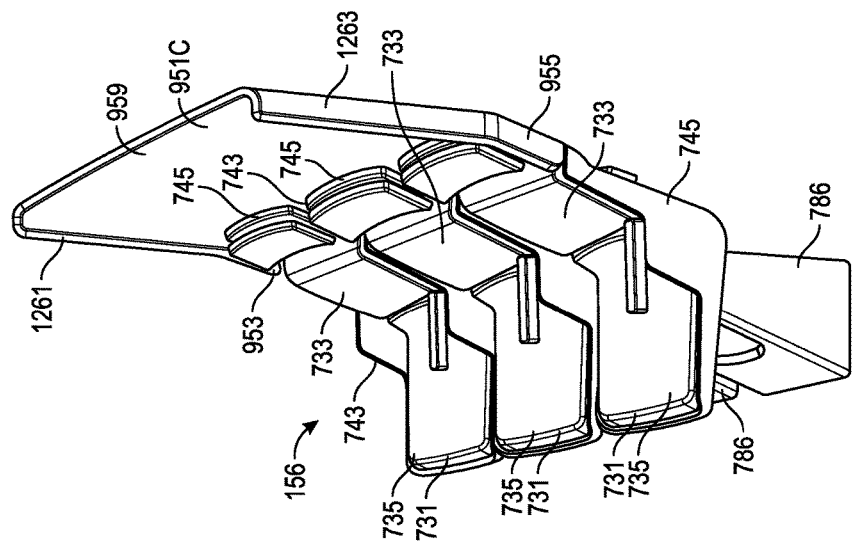
Figures 12C, 12D:
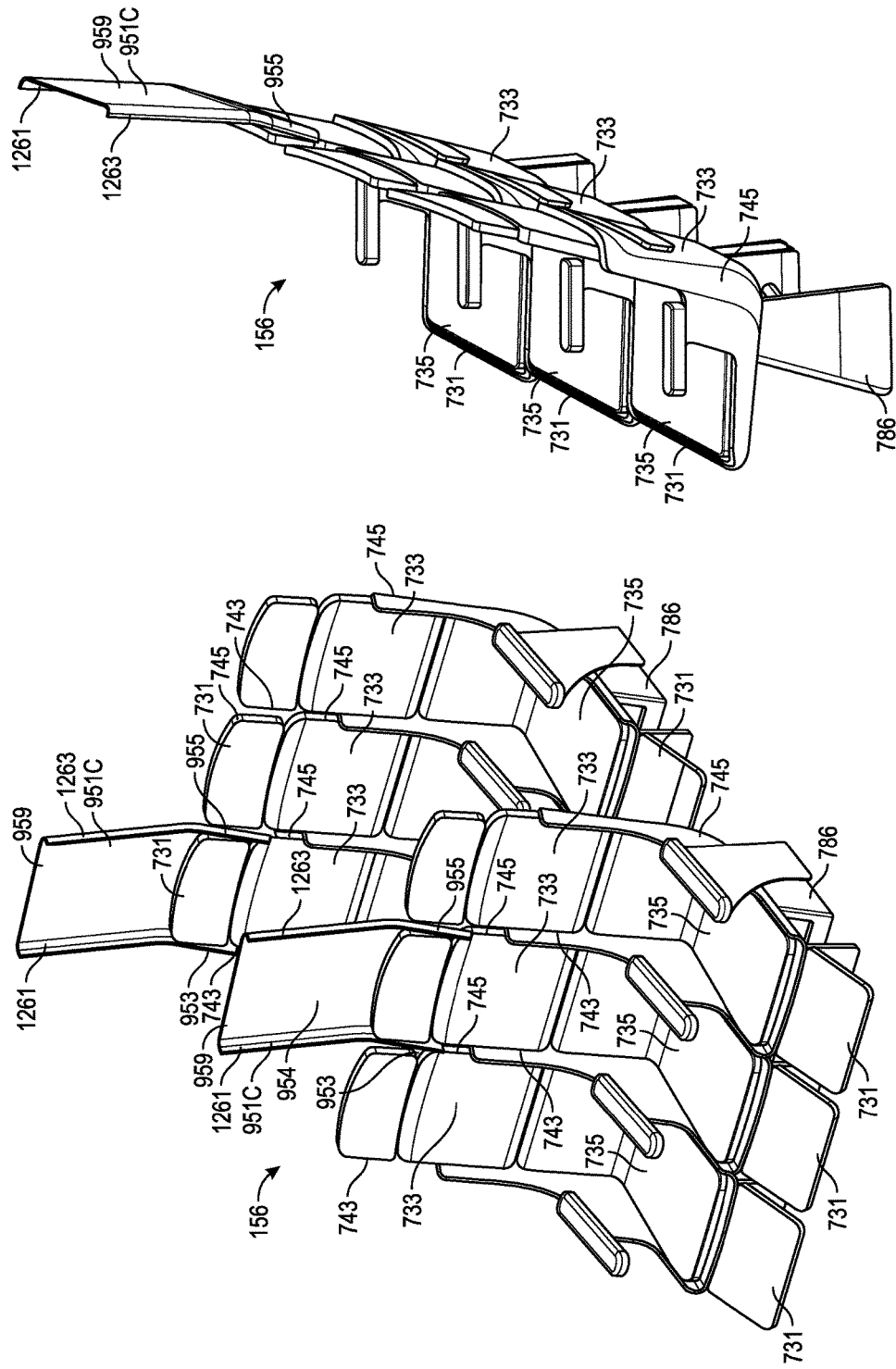

FIGS. 12A-D illustrate the privacy shell 951C, which can be a tide break privacy shell 951C. Compared to the privacy shell 951B, the top panel 959 of the privacy shell 951C is angled at an obtuse angle relative to the back panel 957. As illustrated, the top panel 959 of the privacy shell 951C also comprises the first side top panel 1261 and the second side tip panel 1263. The privacy shell 951C can be configured to cover a single modular seat body 731 (FIGS. 12A and 12B) or a plurality of modular seat bodies 731 (FIGS. 12C and 12D)

FIG. 13 illustrates the privacy shell 951D, which can be a hoop privacy shell 951D. As illustrated in FIG. 13, in various embodiments, the hoop privacy shell 951D covers a portion of the backrest 733 and a portion of the bench 735 in various embodiments. The hoop privacy shell 951D also optionally covers the seat support 786. The hoop privacy shell 951D can cover a single modular seat body 731 or a plurality of modular seat bodies 731.

FIG. 14 illustrates the privacy shell 951E, which can be a sleep privacy shell 951E. As illustrated in FIG. 14, in various embodiments, the side panels 953 and 955 of the sleep privacy shell 951E can be angled. The sleep privacy shell 951E can cover a single modular seat body 731 or a plurality of modular seat bodies 731.

FIG. 15 illustrates the privacy shell 951F, which can be a productivity privacy shell 951F. In some embodiments, the productivity privacy shell 951F can be utilized for passengers working with an IFE device 1527. As illustrated in FIG. 15, in various embodiments, the side panels 953 and 955 of the productivity privacy shell 951F can be angled and the top panel 959 can be substantially parallel to the back panel 957, although they need not be. The productivity privacy shell 951F can cover a single modular seat body 731 or a plurality of modular seat bodies 731.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat shell comprising: a bench comprising a forward edge, an aft edge, and a top surface extending between the forward edge and the aft edge; and a backrest connected to the aft edge of the bench and extending in an upward direction from the top surface of the bench, the backrest adapted to be relative to the bench, the backrest comprising an upright portion connected to the bench and angled at a first angle with respect to the top surface of the bench, and a resting portion connected to the bench and angled at a second angle with respect to the top surface of the bench.

EC 2. The passenger seat shell of any of the preceding or subsequent example combinations, wherein the bench further comprises: a first side edge extending between the forward edge and the aft edge; and a second side edge extending between the forward edge and the aft edge distal from the first side edge; wherein the bench defines a bench length as a distance from the forward edge to the aft edge, wherein the bench defines a bench width as a distance from the first side edge to the second side edge, and wherein the bench width is greater than the bench length.

EC 3. The passenger seat shell of any of the preceding or subsequent example combinations, wherein the bench further comprises: a bench extension extending in a forward direction from the forward edge of the bench proximate the first side edge of the bench, the bench extension comprising a bench extension forward edge, a bench extension first side edge, a bench extension second side edge distal from the bench extension first side edge, and a bench extension top surface extending between the bench extension forward edge, the bench extension first side edge, and the bench extension second side edge.

EC 4. The passenger seat shell of any of the preceding or subsequent example combinations, wherein the bench extension top surface is coplanar with the top surface of the bench, wherein the bench extension first side edge is aligned with the first side edge of the bench, wherein the bench extension defines a bench extension length as a distance from the aft edge of the bench to the bench extension forward edge, wherein the bench extension defines a bench extension width as a distance from the bench extension first side edge to the bench extension second side edge, wherein the bench extension length is greater than the bench length, and wherein the bench extension width is less than the bench width.

EC 5. The passenger seat shell of any of the preceding or subsequent example combinations, wherein the backrest further comprises a recline portion connected to the first side edge of the bench angled with respect to the top surface of the bench.

EC 6. The passenger seat shell of any of the preceding or subsequent example combinations, wherein the recline portion is angled at one of the first angle or the second angle with respect to the top surface of the bench.

EC 7. The passenger seat shell of any of the preceding or subsequent example combinations, wherein the recline portion is angled at a third angle with respect to the top surface of the bench.

EC 8. The passenger seat shell of any of the preceding or subsequent example combinations, wherein the resting portion is curved along a portion of the bench length.

EC 9. A passenger seat assembly comprising: a seat support; and an immobile seat shell mounted on the seat support, the seat shell comprising: a bench comprising a forward edge, an aft edge, and a top surface extending between the forward edge and the aft edge; and a backrest connected to the aft edge of the bench and extending in an upward direction from the top surface of the bench, the backrest comprising an upright portion connected to the bench and angled at a first angle with respect to the top surface of the bench, and a resting portion connected to the bench and angled at a second angle with respect to the top surface of the bench.

EC 10. The passenger seat assembly of any of the preceding or subsequent example combinations, wherein the bench further comprises: a first side edge extending between the forward edge and the aft edge; a second side edge extending between the forward edge and the aft edge distal from the first side edge; and a bench extension extending in a forward direction from the forward edge of the bench proximate the first side edge of the bench.

EC 11. The passenger seat assembly of any of the preceding or subsequent example combinations, wherein the bench extension comprises: a bench extension forward edge; a bench extension first side edge aligned with the first side edge of the bench; a bench extension second side edge distal from the bench extension first side edge; and a bench extension top surface coplanar with the top surface of the bench and extending between the bench extension forward edge, the bench extension first side edge, and the bench extension second side edge.

EC 12. The passenger seat assembly of any of the preceding or subsequent example combinations, wherein the backrest further comprises: a recline portion connected to the first side edge of the bench and the bench extension first side edge, the recline portion angled with respect to the top surface of the bench; and an armrest portion connected to the second side edge of the bench, the armrest portion defining an armrest.

EC 13. The passenger seat assembly of any of the preceding or subsequent example combinations, wherein the backrest further comprises a recline portion connected to the first side edge of the bench angled with respect to the top surface of the bench.

EC 14. The passenger seat assembly of any of the preceding or subsequent example combinations, wherein the bench extension is aligned with the resting portion of the backrest.

EC 15. The passenger seat assembly of any of the preceding or subsequent example combinations, wherein the bench defines a bench length as a distance from the forward edge to the aft edge, wherein the bench defines a bench width as a distance from the first side edge to the second side edge, and wherein the resting portion is curved along a portion of the bench length.

EC 16. A passenger seat shell comprising: a bench comprising a forward edge, an aft edge distal from the forward edge, a first side edge extending from the forward edge to the aft edge, a second side edge extending from the forward edge to the aft edge distal from the first side edge, and a top surface extending between the forward edge and the aft edge; and a backrest connected to the bench, the backrest extending in an upward direction from the top surface of the bench, the backrest immobile relative to the bench, the backrest comprising an upright portion connected to the aft edge of the bench and angled at a first angle with respect to the top surface of the bench, and a recline portion connected to the first side edge of the bench and angled at a second angle with respect to the top surface of the bench.

EC 17. The passenger seat shell of any of the preceding or subsequent example combinations, wherein the bench further comprises a bench extension extending in a forward direction from the forward edge of the bench proximate the first side edge of the bench, the bench extension comprising: a bench extension forward edge; a bench extension first side edge aligned with the first side edge of the bench; a bench extension second side edge distal from the bench extension first side edge; and a bench extension top surface extending between the bench extension forward edge, the bench extension first side edge, and the bench extension second side edge.

EC 18. The passenger seat shell of any of the preceding or subsequent example combinations, wherein the backrest further comprises a resting portion between the upright portion and the recline portion, the resting portion connected to the aft edge of the bench, the resting portion angled at a third angle with respect to the top surface of the bench.

EC 19. The passenger seat shell of any of the preceding or subsequent example combinations, wherein the bench defines a bench length as a distance from the forward edge to the aft edge, wherein the bench defines a bench width as a distance from the first side edge to the second side edge, and wherein the resting portion is curved along a portion of the bench length.

EC 20. The passenger seat shell of any of the preceding or subsequent example combinations, wherein the backrest further comprises an armrest portion connected to the second side edge of the bench, the armrest portion defining an armrest.

EC 21. A passenger seat assembly comprising: a modular seat body comprising a backrest connected to a base, the backrest comprising a first side, a second side distal from the first side, a forward-facing surface extending between the first side and the second side, and an aft-facing surface extending between the first side and the second side; and a privacy shell removably mounted to at least one of the first side, the second side, or the aft-facing surface of the backrest, the privacy shell covering at least a portion of the first side of the backrest.

EC 22. The passenger seat assembly of any of the preceding or subsequent example combinations, wherein the privacy shell covers at least a portion of the second side of the backrest.

EC 23. The passenger seat assembly of any of the preceding or subsequent example combinations, wherein the privacy shell comprises: a first side panel; a second side panel distal from the first side panel; and a back panel extending between the first side panel and the second side panel, wherein the back panel is mounted to the backrest.

EC 24. The passenger seat assembly of any of the preceding or subsequent example combinations, wherein the privacy shell further comprises a top panel connected to the back panel and extending between the first side panel and the second side panel, and wherein the top panel is angled with respect to the back panel.

EC 25. The passenger seat assembly of any of the preceding or subsequent example combinations, wherein the top panel is curved.

EC 26. The passenger seat assembly of any of the preceding or subsequent example combinations, wherein the top panel is angled at an obtuse angle relative to the back panel.

EC 27. The passenger seat assembly of any of the preceding or subsequent example combinations, wherein the top panel is angled at a right angle relative to the back panel.

EC 28. The passenger seat assembly of any of the preceding or subsequent example combinations, wherein the top panel is angled at an acute angle relative to the back panel.

EC 29. The passenger seat assembly of any of the preceding or subsequent example combinations, wherein at least one of the first side panel, the second side panel, and the back panel are curved.

EC 30. The passenger seat assembly of any of the preceding or subsequent example combinations, wherein at least a portion of the privacy shell extends in a forward direction relative to the forward-facing surface of the backrest.

EC 31. The passenger seat assembly of any of the preceding or subsequent example combinations, wherein the backrest further comprises a headrest, and wherein the privacy shell is mounted to the headrest.

EC 32. The passenger seat assembly of any of the preceding or subsequent example combinations, wherein the privacy shell covers at least a portion of the base.

EC 33. A passenger seat assembly comprising: a plurality of modular seat bodies, each modular seat body comprising a backrest connected to a base, each backrest of the plurality of modular seat bodies comprising a first side, a second side distal from the first side, a forward-facing surface extending between the first side and the second side, and an aft-facing surface extending between the first side and the second side; and a privacy shell removably mounted to at least a one of the plurality of modular seat bodies, wherein the privacy shell is mounted to at least one of the first side, the second side, or the aft-facing surface of the backrest of the one of the plurality of modular seat bodies, and wherein the privacy shell covers at least a portion of at least one of the first side or the second side of the backrest of a second of the plurality of modular seat bodies.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat shell comprising:
   a bench comprising a forward edge, an aft edge, and a top surface extending between the forward edge and the aft edge; and
   a backrest connected to the aft edge of the bench and extending in an upward direction from the top surface of the bench, the backrest adapted to be immobile relative to the bench, the backrest comprising:
      an upright portion connected to the aft edge of the bench and angled at a first angle with respect to the top surface of the bench such that the upright portion extends rearward relative to the aft edge of the bench, and
      a resting portion connected to the aft edge of the bench and angled at a second angle with respect to the top surface of the bench such that the resting portion extends rearward relative to the aft edge of the bench,
   wherein the second angle is greater than the first angle, and
   wherein the resting portion of the backrest extends rearward relative to the upright portion such that the resting portion defines a rearward-most extension of the passenger seat shell.

2. The passenger seat shell of claim 1, wherein the bench further comprises:
   a first side edge extending between the forward edge and the aft edge; and
   a second side edge extending between the forward edge and the aft edge distal from the first side edge,
   wherein the bench defines a bench length as a distance from the forward edge to the aft edge,
   wherein the bench defines a bench width as a distance from the first side edge to the second side edge, and
   wherein the bench width is greater than the bench length.

3. The passenger seat shell of claim 2, wherein the upright portion is proximate to the second side edge and wherein the resting portion is proximate to the first side edge, and wherein the bench further comprises:
   a bench extension extending in a forward direction from the forward edge of the bench proximate the first side edge of the bench, the bench extension comprising:
      a bench extension forward edge,
      a bench extension first side edge,
      a bench extension second side edge distal from the bench extension first side edge, and
      a bench extension top surface extending between the bench extension forward edge, the bench extension first side edge, and the bench extension second side edge.

4. The passenger seat shell of claim 3, wherein the bench extension top surface is coplanar with the top surface of the bench, wherein the bench extension second side edge is aligned with the second side edge of the bench, wherein the bench extension defines a bench extension length as a distance from the aft edge of the bench to the bench extension forward edge, wherein the bench extension defines a bench extension width as a distance from the bench extension first side edge to the bench extension second side edge, wherein the bench extension length is greater than the bench length, and wherein the bench extension width is less than the bench width.

5. The passenger seat shell of claim 2, wherein the backrest further comprises a recline portion connected to the second side edge of the bench angled with respect to the top surface of the bench.

6. The passenger seat shell of claim 5, wherein the recline portion is angled at one of the first angle or the second angle with respect to the top surface of the bench.

7. The passenger seat shell of claim 5, wherein the recline portion is angled at a third angle with respect to the top surface of the bench.

8. The passenger seat shell of claim 2, wherein the resting portion is curved along a portion of the bench length.

9. A passenger seat assembly comprising:
a seat support; and
a seat shell mounted on the seat support, the seat shell comprising: a bench comprising a forward edge, an aft edge, and a top surface extending between the forward edge and the aft edge; and a backrest connected to the aft edge of the bench and extending in an upward direction from the top surface of the bench, the backrest adapted to be immobile relative to the bench, the backrest comprising:
an upright portion connected to the bench and angled at a first angle with respect to the top surface of the bench such that the upright portion extends rearward relative to the bench, and
a resting portion connected to the bench and angled at a second angle with respect to the top surface of the bench such that the upright portion extends rearward relative to the bench,
wherein the upright portion and the resting portion are oriented in a same direction relative to the forward edge of the bench, and
wherein the resting portion extends rearward relative to the upright portion such that the resting portion defines a rearward-most extension of the seat shell.

10. The passenger seat assembly of claim 9, wherein the bench further comprises:
a first side edge extending between the forward edge and the aft edge;
a second side edge extending between the forward edge and the aft edge distal from the first side edge; and
a bench extension extending in a forward direction from the forward edge of the bench proximate the first side edge of the bench.

11. The passenger seat assembly of claim 10, wherein the upright portion is proximate to the second side edge and wherein the resting portion is proximate to the first side edge, and wherein the bench extension comprises:
a bench extension forward edge;
a bench extension first side edge aligned with the first side edge of the bench;
a bench extension second side edge distal from the bench extension first side edge; and
a bench extension top surface coplanar with the top surface of the bench and extending between the bench extension forward edge, the bench extension first side edge, and the bench extension second side edge.

12. The passenger seat assembly of claim 11, wherein the backrest further comprises:
a recline portion connected to the first side edge of the bench and the bench extension first side edge, the recline portion angled with respect to the top surface of the bench; and
an armrest portion connected to the second side edge of the bench, the armrest portion defining an armrest.

13. The passenger seat assembly of claim 10, wherein the backrest further comprises a recline portion connected to the second side edge of the bench angled with respect to the top surface of the bench.

14. The passenger seat assembly of claim 10, wherein the bench extension is aligned with the resting portion of the backrest.

15. The passenger seat assembly of claim 10, wherein the bench defines a bench length as a distance from the forward edge to the aft edge, wherein the bench defines a bench width as a distance from the first side edge to the second side edge, and wherein the resting portion is curved along a portion of the bench length.

16. A passenger seat shell comprising:
a bench comprising:
a forward edge;
an aft edge distal from the forward edge;
a first side edge extending from the forward edge to the aft edge, wherein a length of the first side edge defines a length of the bench;
a second side edge extending from the forward edge to the aft edge distal from the first side edge; and
a top surface extending between the forward edge and the aft edge; and
a backrest connected to the bench, the backrest extending in an upward direction from the top surface of the bench, the backrest adapted to be immobile relative to the bench, the backrest comprising:
an upright portion connected to the aft edge of the bench proximate to the first side edge of the bench and angled at a first angle with respect to the top surface of the bench, and
a resting portion connected to the aft edge of the bench proximate to the second side edge of the bench and angled at a second angle with respect to the top surface of the bench,
wherein the second angle is greater than the first angle, and
wherein the resting portion defines a rearward-most extension of the passenger seat shell.

17. The passenger seat shell of claim 16, wherein the bench further comprises a bench extension extending in a forward direction from the forward edge of the bench proximate the second side edge of the bench, the bench extension comprising:
a bench extension forward edge;
a bench extension first side edge aligned with the first side edge of the bench;
a bench extension second side edge distal from the bench extension first side edge; and
a bench extension top surface extending between the bench extension forward edge, the bench extension first side edge, and the bench extension second side edge,
wherein a distance from the aft edge of the bench to the bench extension forward edge is greater than a distance from the aft edge of the bench to the forward edge of the bench.

18. The passenger seat shell of claim 16, wherein the backrest further comprises a recline portion connected to the second side edge of the bench, the recline portion angled at a third angle with respect to the top surface of the bench.

19. The passenger seat shell of claim 18, wherein the bench defines a bench length as a distance from the forward edge to the aft edge, wherein the bench defines a bench width as a distance from the first side edge to the second side edge, and wherein the resting portion is curved along a portion of the bench length.

20. The passenger seat shell of claim 18, wherein the backrest further comprises an armrest portion connected to the first side edge of the bench, the armrest portion defining an armrest.

* * * * *